US012456283B2

(12) United States Patent
Adato et al.

(10) Patent No.: US 12,456,283 B2
(45) Date of Patent: Oct. 28, 2025

(54) IDENTIFYING VISUAL CONTENTS USED FOR TRAINING OF INFERENCE MODELS

(71) Applicant: BRIA ARTIFICIAL INTELLIGENCE LTD, Tel Aviv (IL)

(72) Inventors: Yair Adato, Kfar Ben Nun (IL); Ran Achituv, Kefar Sava (IL); Eyal Gutflaish, Beer Sheva (IL); Dvir Yerushalmi, Kfar Saba (IL)

(73) Assignee: BRIA ARTIFICIAL INTELLIGENCE LTD, Tel Aviv (IL)

( * ) Notice: Subject to any disclaimer, the term of this patent is extended or adjusted under 35 U.S.C. 154(b) by 422 days.

(21) Appl. No.: 17/986,378

(22) Filed: Nov. 14, 2022

(65) Prior Publication Data

US 2023/0154153 A1 May 18, 2023

Related U.S. Application Data

(63) Continuation of application No. PCT/IL2022/051189, filed on Nov. 9, 2022.

(Continued)

(51) Int. Cl.
*G06V 10/764* (2022.01)
*G06F 18/214* (2023.01)
(Continued)

(52) U.S. Cl.
CPC .......... *G06V 10/764* (2022.01); *G06F 18/214* (2023.01); *G06F 18/24* (2023.01);
(Continued)

(58) Field of Classification Search
CPC .. G06V 10/764; G06V 10/772; G06V 10/774; G06V 10/776; G06V 20/70;
(Continued)

(56) References Cited

U.S. PATENT DOCUMENTS 12,182,945 B2  12/2024  Samec et al.
2013/0195361 A1  8/2013  Deng et al.
(Continued)

OTHER PUBLICATIONS

Chen, Z., Jiang, R., Duke, B., Zhao, H., Aarabi, P. (2022). Exploring Gradient-Based Multi-directional Controls in GANs. In: Avidan, S., Brostow, G., Cissé, M., Farinella, G.M., Hassner, T. (eds) Computer Vision—ECCV 2022. ECCV 2022 (Year: 2022).*

(Continued)

*Primary Examiner* — Andrae S Allison
(74) *Attorney, Agent, or Firm* — The Roy Gross Law Firm, LLC; Roy Gross

(57) ABSTRACT

Systems, methods and non-transitory computer readable media for identifying visual contents used for training of inference models are provided. A specific visual content may be received. Data based on at least one parameter of an inference model may be received. The inference model may be a result of training a machine learning algorithm using a plurality of training examples. Each training example of the plurality of training examples may include a visual content. The data and the specific visual content may be analyzed to determine a likelihood that the specific visual content is included in at least one training example of the plurality of training examples. A digital signal indicative of the likelihood that the specific visual content is included in at least one training example of the plurality of training examples may be generated.

22 Claims, 16 Drawing Sheets

Related U.S. Application Data

(60) Provisional application No. 63/279,111, filed on Nov. 14, 2021.

(51) Int. Cl.
| | | |
|---|---|---|
| *G06F 18/24* | (2023.01) | |
| *G06T 3/40* | (2024.01) | |
| *G06T 5/50* | (2006.01) | |
| *G06T 7/00* | (2017.01) | |
| *G06T 11/00* | (2006.01) | |
| *G06T 19/00* | (2011.01) | |
| *G06V 10/772* | (2022.01) | |
| *G06V 10/774* | (2022.01) | |

(52) U.S. Cl.
CPC .................. *G06T 3/40* (2013.01); *G06T 5/50* (2013.01); *G06T 7/0002* (2013.01); *G06T 11/001* (2013.01); *G06T 19/006* (2013.01); *G06V 10/772* (2022.01); *G06V 10/774* (2022.01); *G06T 2207/20081* (2013.01)

(58) Field of Classification Search
CPC .. G06V 10/7788; G06V 10/454; G06V 10/82; G06F 18/214; G06F 18/24; G06T 3/40; G06T 5/50; G06T 7/0002; G06T 11/001; G06T 19/006; G06T 2207/20081; G06T 11/00; G06T 19/20; G06N 3/0475; G06N 3/084; G06N 3/045; G06N 3/0464; G06N 3/094

See application file for complete search history.

(56) References Cited

U.S. PATENT DOCUMENTS

| | | | |
|---|---|---|---|
| 2019/0080205 A1 | 3/2019 | Kaufhold et al. | |
| 2020/0066025 A1 | 2/2020 | Peebler et al. | |
| 2020/0320322 A1* | 10/2020 | Liang | G06V 40/168 |
| 2020/0356591 A1 | 11/2020 | Yada et al. | |
| 2021/0019541 A1* | 1/2021 | Wang | G06V 40/172 |
| 2021/0073958 A1 | 3/2021 | Masuda | |
| 2021/0165932 A1 | 6/2021 | Mohan et al. | |
| 2021/0350604 A1 | 11/2021 | Pejsa et al. | |
| 2022/0180602 A1 | 6/2022 | Hao et al. | |
| 2023/0351807 A1* | 11/2023 | Ren | G06V 20/40 |
| 2023/0360364 A1* | 11/2023 | Wu | G06V 10/7753 |
| 2025/0037428 A1* | 1/2025 | Adato | G06T 11/001 |

OTHER PUBLICATIONS

Lee, Seunghun, Sunghyun Cho, and Sunghoon Im. "Dranet: Disentangling representation and adaptation networks for unsupervised cross-domain adaptation." Proceedings of the IEEE/CVF conference on computer vision and pattern recognition. 2021. (Year: 2021).*

S. Jiang, Z. Tao and Y. Fu, "Geometrically Editable Face Image Translation With Adversarial Networks," in IEEE Transactions on Image Processing, vol. 30, pp. 2771-2783, 2021 (Year: 2021).*

PCT International Search Report for International Application No. PCT/IL2022/051189, mailed Feb. 9, 2023, 5pp.

PCT Written Opinion for International Application No. PCT/IL2022/051189, mailed Feb. 9, 2023, 7pp.

\* cited by examiner

400

| 402 Receiving a first visual content generated using a generative model, the generative model is a result of training a machine learning algorithm using a plurality of training examples, each training example of the plurality of training examples is associated with a visual content |

| 404 Determining one or more properties of the first visual content |

| 406 For each training example of the plurality of training examples, analyzing the visual content associated with the training example to determine one or more properties of the visual content associated with the training example |

| 408 Using the one or more properties of the first visual content and the properties of the visual contents associated with the plurality of training examples to attribute the first visual content to a first subgroup of at least one but not all of the plurality of training examples |

| 410 Determining that the at least one visual content associated with the training examples of the first subgroup is associated with a first at least one source |

| 412 For each source of the first at least one source, updating a data-record associated with the source based on the attribution |

422 Receiving a second visual content generated using the generative model

424 Determining one or more properties of the second visual content

426 Using the one or more properties of the second visual content and the properties of the visual contents associated with the plurality of training examples to attribute the second visual content to a second subgroup of at least one but not all of the plurality of training examples, the second subgroup includes at least one training example not included in the first subgroup 428 Determining that the at least one visual content associated with the training examples of the second subgroup is associated with a second at least one source, the second at least one source includes one or more sources not included in the first at least one source 430 Based on the second at least one source, forgoing usage of the second visual content 432 Initiating usage of the first visual content

| 422 Receiving a second visual content generated using the generative model |

| 424 Determining one or more properties of the second visual content |

| 426 Using the one or more properties of the second visual content and the properties of the visual contents associated with the plurality of training examples to attribute the second visual content to a second subgroup of at least one but not all of the plurality of training examples, the second subgroup includes at least one training example not included in the first subgroup |

| 448 Accessing a data-structure associating visual contents with amounts |

| 450 Using the data-structure to determine that the at least one visual content associated with the training examples of the first subgroup is associated a first total amount |

| 452 Using the data-structure to determine that the at least one visual content associated with the training examples of the second subgroup is associated a second total amount |

| 454 Based on the first and second total amounts, forgoing usage of the second visual content and initiating usage of the first visual content |

| 456 Further basing the updates to data-records associated with the sources on the first total amount |

462  Using the one or more properties of the first visual content to embed the first visual content in a mathematical space

464  For each training example of the plurality of training examples, using the one or more properties of the visual content associated with the training example to embed the visual content associated with the training example in the mathematical space

466  Using the mathematical space to select the first subgroup of at least one but not all of the plurality of training examples

482  Using a parameter of the generative model and the properties of the visual contents associated with the plurality of training examples to attribute the parameter of the generative model to a second subgroup of at least one but not all of the plurality of training examples

484  Determining that the at least one visual content associated with the training examples of the second subgroup is associated with a second at least one source

486  For each source of the second at least one source, updating a data-record associated with the source based on the attribution of the parameter of the generative model

| 502 Receiving a specific visual content |

| 504 Accessing data based on at least one parameter of an inference model, the inference model is a result of training a machine learning algorithm using a plurality of training examples, each training example of the plurality of training examples includes a visual content |

| 506 Analyzing the data and the specific visual content to determine a likelihood that the specific visual content is included in at least one training example of the plurality of training examples |

| 508 Generating a digital signal indicative of the likelihood that the specific visual content is included in at least one training example of the plurality of training examples |

| 522 Using the specific visual content to generate a plurality of variations of the specific visual content |
|---|

↓

| 524 For each variation of the plurality of variations, using the variation and the at least one parameter of the inference model to obtain an output of the inference model corresponding to the variation |
|---|

↓

| 526 Basing the data on the outputs of the inference model corresponding to the plurality of variations |
|---|

| 542 Obtaining a plurality of directions in a mathematical space |
|---|

↓

| 544 Obtaining a specific mathematical object in the mathematical space corresponding to the specific visual content |
|---|

↓

| 546 For each direction of the plurality of directions, using the specific mathematical object and the direction to determine a mathematical object in the mathematical space corresponding to the specific mathematical object and the direction |
|---|

↓

| 548 For each direction of the plurality of directions, generating a visual content corresponding to the mathematical object in the mathematical space corresponding to the specific mathematical object and the direction, thereby generating the plurality of variations of the specific visual content |
|---|

| 562 Calculating a convolution of at least part of the specific visual content to thereby obtain a result value of the calculated convolution of the at least part of the specific visual content |
|---|

| 564 Calculating a mathematical function of the result value of the calculated convolution of the at least part of the specific visual content |
|---|

| 566 Selecting a threshold based on the data |
|---|

| 568 Comparing the threshold with the mathematical function of the result value of the calculated convolution of the at least part of the specific visual content |
|---|

| 570 Determining the likelihood that the specific visual content is included in at least one training example of the plurality of training examples based on a result of the comparison of the threshold with the mathematical function of the result value of the calculated convolution of the at least part of the specific visual content |
|---|

| 702 Receiving first digital signals representing virtual content in an extended reality environment |

| 704 Using the first digital signals to identify a non-realistic portion of the virtual content |

| 706 Using a generative model to analyze the first digital signals to generate a realistic version of the identified non-realistic portion of the virtual content |

| 708 Generating a second digital signals configured to cause a wearable extended reality appliance to present the generated realistic version instead of the identified non-realistic portion of the virtual content in the extended reality environment |

| 902 Accessing one or more artificially generated visual contents, the one or more artificially generated visual contents include a particular artificially generated visual content |
|---|

↓

| 904 Accessing one or more captured visual contents, each visual content of the one or more captured visual contents was captured using an image sensor from a real physical environment |
|---|

↓

| 906 For each person of a plurality of persons, presenting to the person a mix of visual contents, the mix of visual contents includes at least one visual content of the one or more artificially generated visual contents and at least one visual content of the one or more captured visual contents, the mix of visual contents includes the particular artificially generated visual content |
|---|

↓

| 908 For each person of the plurality of persons, receiving from the person a reaction to the presentation to the person, wherein for each visual content of a group of at least one of the mix of visual contents, the reaction is indicative of whether the person believes that the visual content is an artificially generated visual content |
|---|

↓

| 910 Determining a degree of realism of the particular artificially generated visual content based on the reactions |
|---|

| 922 Determining a degree of realism of a specific artificially generated visual content based on at least one reaction to the specific artificially generated visual content |
|---|

| 924 Comparing data associated with the specific artificially generated visual content to data associated with the particular artificially generated visual content |
|---|

| 926 Based on a result of the comparison, determining at least one reason for the determined degree of realism of the particular artificially generated visual content |
|---|

| 922 Determining a degree of realism of a specific artificially generated visual content based on at least one reaction to the specific artificially generated visual content |
|---|

↓

| 944 Determining a particular mathematical object in a mathematical space associated with the particular artificially generated visual content |
|---|

↓

| 946 Determining a specific mathematical object in the mathematical space associated with the specific artificially generated visual content |
|---|

↓

| 948 Using the determined degree of realism of the particular artificially generated visual content, the determined degree of realism of the specific artificially generated visual content, the particular mathematical object and the specific mathematical object to determine a new mathematical object in the mathematical space, the new mathematical object differs from the particular mathematical object and the specific mathematical object |
|---|

↓

| 950 Using the new mathematical object in the mathematical space to generate a new artificially generated visual content |
|---|

FIG. 9C

IDENTIFYING VISUAL CONTENTS USED FOR TRAINING OF INFERENCE MODELS

CROSS REFERENCE TO RELATED APPLICATIONS

This application is a continuation of International Application No. PCT/IL2022/051189, filed Nov. 9, 2022, which claims the benefit of priority of U.S. Provisional Patent Application No. 63/279,111, filed on Nov. 14, 2021. The foregoing applications are incorporated herein by reference in their entirety.

BACKGROUND

I. Technical Field

The present disclosure relates generally to systems and methods for analyzing inference models. More specifically, the present disclosure relates to systems and methods for analyzing inference models to identify visual contents used for training of the inference models.

II. Background Information

Vast number of visual contents, such as images and videos, are created, edited and viewed by different entities. Nowadays, many visual contents are modified to better suit different criteria. However, achieving high quality results when modifying visual contents still requires significant efforts. Moreover, selecting the optimal modification for different purposes is still challenging. This is especially true when modification to a large number of visual content items is required. Therefore, automating the modification of visual contents is desired.

SUMMARY

Embodiments consistent with the present disclosure provide systems, methods and non-transitory computer readable media for visual content generation.

In some examples, systems, methods and non-transitory computer readable media for attributing generated visual content to training examples are provided. For example, a first visual content generated using a generative model may be received. The generative model may be a result of training a machine learning algorithm using a plurality of training examples. Each training example of the plurality of training examples may be associated with a visual content. One or more properties of the first visual content may be determined. For each train example of the plurality of training examples, the visual content associated with the training example may be analyzed to determine one or more properties of the visual content associated with the training example. The one or more properties of the first visual content and the properties of the visual contents associated with the plurality of training examples may be used to attribute the first visual content to a first subgroup of at least one but not all of the plurality of training examples. Further, it may be determined that the at least one visual content associated with the training examples of the first subgroup is associated with a first at least one source. In one example, for each source of the first at least one source, a data-record associated with the source may be updated based on the attribution.

In some examples, systems, methods and non-transitory computer readable media for identifying visual contents used for training of inference models are provided. For example, a specific visual content may be received. Further, data based on at least one parameter of an inference model may be received. The inference model may be a result of training a machine learning algorithm using a plurality of training examples. Each training example of the plurality of training examples may include a visual content. The data and the specific visual content may be analyzed to determine a likelihood that the specific visual content is included in at least one training example of the plurality of training examples. A digital signal indicative of the likelihood that the specific visual content is included in at least one training example of the plurality of training examples may be generated.

In some examples, systems, methods and non-transitory computer readable media for transforming non-realistic virtual environments to realistic virtual environments are provided. For example, first digital signals representing virtual content in an extended reality environment may be received. The first digital signals may be used to identify a non-realistic portion of the virtual content. Further, a generative model may be used to analyze the first digital signals to generate a realistic version of the identified non-realistic portion of the virtual content. In one example, second digital signals configured to cause a wearable extended reality appliance to present the generated realistic version instead of the identified non-realistic portion of the virtual content in the extended reality environment may be generated.

In some examples, systems, methods and non-transitory computer readable media for determining a degree of realism of an artificially generated visual content are provided. For example, one or more artificially generated visual contents may be accessed. The one or more artificially generated visual contents may include a particular artificially generated visual content. Further, one or more captured visual contents may be accessed. Each visual content of the one or more captured visual contents may be a visual content captured using an image sensor from a real physical environment. For each person of a plurality of persons, a mix of visual contents may be presented to the person, where the mix of visual contents may include at least one visual content of the one or more artificially generated visual contents and at least one visual content of the one or more captured visual contents, and where the mix of visual contents may include the particular artificially generated visual content. For each person of the plurality of persons, a reaction to the presentation may be received from the person, where for each visual content of a group of at least one of the mix of visual contents, the reaction may be indicative of whether the person believes that the visual content is an artificially generated visual content. A degree of realism of the particular artificially generated visual content may be determined based on the reactions.

Consistent with other disclosed embodiments, non-transitory computer-readable storage media may store software program comprising data and/or computer implementable instructions. The computer implementable instructions, when executed by at least one processing device, may cause the at least one processing device to perform one or more of the methods and/or steps described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4A is a flowcharts of an exemplary method for attributing generated visual content to training examples.

FIG. 4B is a flowchart of an exemplary method for attributing generated visual content to training examples and selecting visual content for specific usage based on the attribution.

FIG. 4C is a flowchart of an exemplary method for attributing generated visual content to training examples and selecting visual content for specific usage based on the attribution.

FIGS. 4D and 4E are flowcharts of exemplary methods for attributing generated visual content to training examples.

FIGS. 5A, 5B, 5C and 5D are flowcharts of exemplary methods for identifying visual contents used for training of inference models.

FIG. 7 is a flowchart of an exemplary method for transforming non-realistic virtual environments to realistic virtual environments.

FIGS. 9A, 9B and 9C are flowcharts of exemplary methods for determining a degree of realism of an artificially generated visual content.

DETAILED DESCRIPTION

Figure 1A:
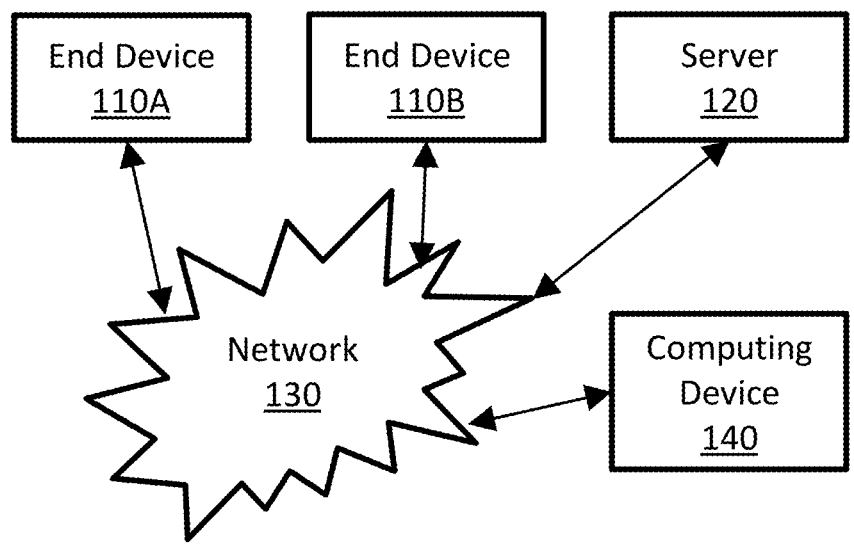
FIG. 1A is an illustration of an exemplary communication system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing device", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance", "in one example", "in another example", "in a different example", "in some examples", "in an additional example", "in yet another example" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is an illustration of an exemplary communication system. In this example, the communication system may include: one or more end devices 110 (such as end device 110A, end device 110B, etc.), one or more servers (such as server 120), a communication network 130, and one or more other computing devices (such as computing device 140). In this example, end devices 110 may communicate with server 120, with computing device 140, with each other, and so forth. The communication may be using communication network 130 and/or directly. Possible implementations of an end device 110 and/or of server 120 and/or of computing device 140 may include computing device 200 as described in FIGS. 2A and 2B. In other example, an end device 110 and/or of server 120 and/or of computing device 140 may be implemented using a cloud platform, for example as a physical computing device or a virtual computing device in a cloud platform. Some other non-limiting examples of possible implementations of end device 110 may include a mobile phone, a smartphone, a tablet, a wearable computing device, a personal computer (PC), and so forth. In some examples, end devices 110 may communicate with server 120, with computing device 140, with each other, and so forth. Possible implementations of an end device 110 and/or of server 120 and/or of computing device 140 may connect to communication network 130 using a local router, directly, through another communication device, and so forth. Some non-limiting examples of communication network 130 may include the Internet, phone networks, cellular networks, satellite communication networks, private communication networks, virtual private networks (VPN), and so forth.

Figure 1B:
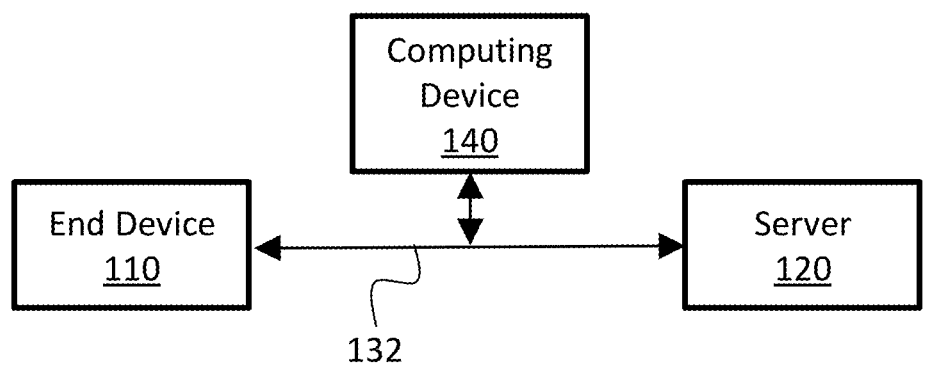
FIG. 1B is an illustration of an exemplary communication system.

FIG. 1B is an illustration of an exemplary communication system. In this example, end device 110 communicates with server 120 using a communication hardware 132. For example, end device 110 communicates with server 120 directly, through a different communication device, over a communication line, using a communication network (such as communication network 130), and so forth. In this example, another computing device 140 may observe and/or modify and/or block the communication between end device 110 and server 120. In one example, a communication line between end device 110 communicates and server 120 may be a direct communication line, may be a communication line through another device, may be a communication line over a communication network (such as communication network 130), and so forth.

FIGS. 1A and 1B illustrate some possible implementations of a communication system. In some embodiments, other communication systems that enable communication between end devices 110 may communicate and/or server 120 and/or computing device 140 may be used.

Figure 2A:
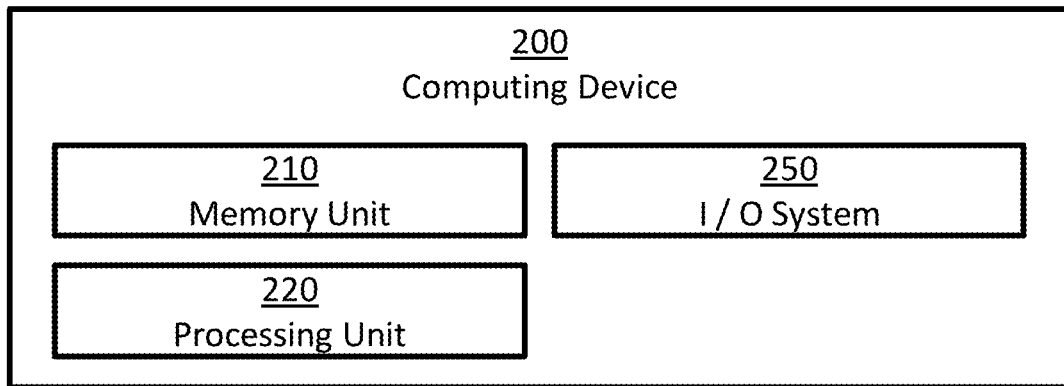
FIG. 2A is a simplified block diagram of an example for one possible implementation of a computing device.

FIG. 2A is a simplified block diagram of an example for one possible implementation of a computing device. In this example, computing device 200 may comprise: one or more memory units 210, one or more processing units 220, and input/output system 250. In some implementations, computing device 200 may comprise additional components, while some components listed above may be excluded.

Figure 2B:
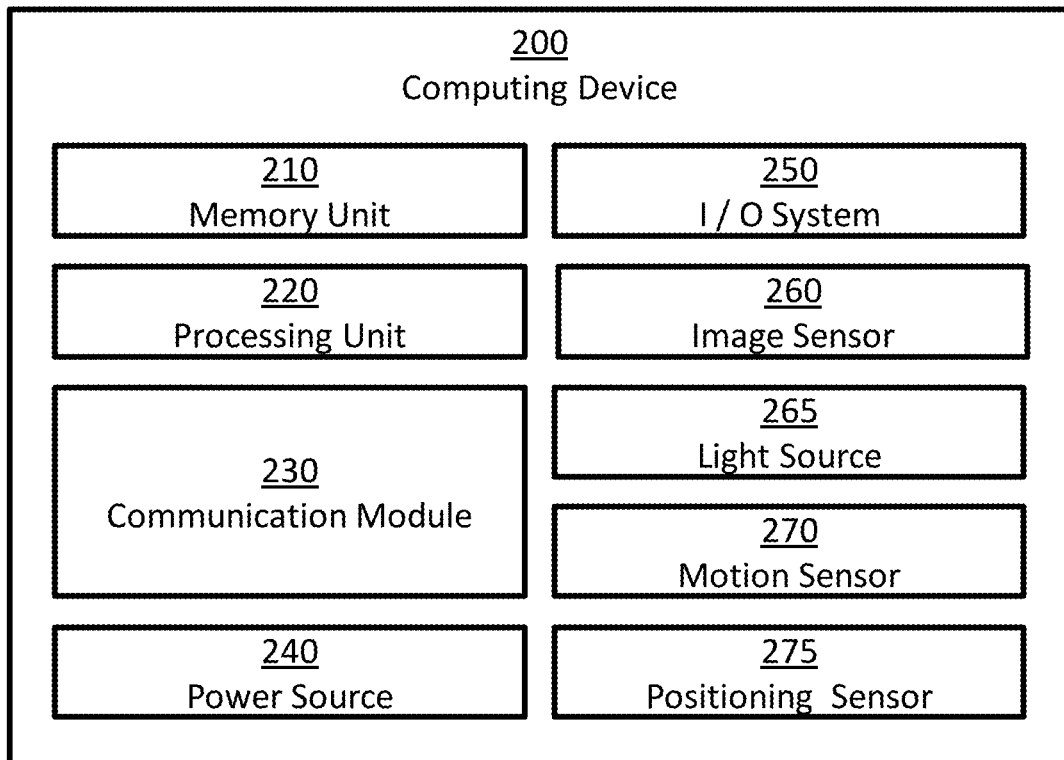
FIG. 2B is a simplified block diagram of an example for one possible implementation of a computing device.

FIG. 2B is a block diagram illustrating a possible implementation of computing device 200. In this example, computing device 200 may comprise: one or more memory units 210, one or more processing units 220, one or more communication modules 230, one or more power sources 240, input/output system 250, one or more image sensors 260, one or more light sources 265, one or more motion sensors 270, and one or more positioning sensors 275. In some implementations, computing device 200 may comprise additional components, while some components listed above may be excluded. For example, in some implementations computing device 200 may also comprise at least one of the following: one or more user input devices, one or more output devices, and so forth. In another example, in some implementations at least one of the following may be excluded from computing device 200: memory units 210, communication modules 230, power sources 240, input/output system 250, image sensors 260, light sources 265, motion sensors 270, and positioning sensors 275.

In some embodiments, one or more power sources 240 may be configured to power computing device 200. Possible non-limiting implementation examples of power sources 240 may include: one or more electric batteries, one or more capacitors, one or more connections to external power sources, one or more power convertors, any combination of the above, and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible non-limiting implementation examples of the processing units 220 may include one or more single core processors, one or more multicore processors, one or more controllers, one or more application processors, one or more system on a chip processors, one or more central processing units, one or more graphical processing units, one or more neural processing units, any combination of the above, and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors, image sensors 260, motion sensors 270, positioning sensors 275, temperature sensors, and so forth.

In some embodiments, the input/output system 250 may include or be configured to connect with input and/or output devices, such as keyboards, computer mouses, touch pads, touch screens, gesture recognition systems, image sensors, audio sensors, visual indicators (such as LED visual indicators), audio speakers, audio beepers, display screens, extended reality systems, and so forth. In some examples, input and/or output devices may be configured to generate digital signal based on inputs from a user, a person, or an environment, and/or to generate physical output to a user, a person or in an environment based on digital signals. In one example, the input/output system 250 may be configured to store and/or receive such digital signals from memory unit 210. In one example, the input/output system 250 may be configured to receive and/or provide such digital signals from and/or to processing unit 220 and/or communication module 230.

In some embodiments, the one or more image sensors 260 may be configured to capture visual information by converting light to: image data, images, a sequence of images, videos, 3D images, a sequence of 3D images, a 3D videos, and so forth. In some examples, the captured visual information may be stored in memory units 210. In some additional examples, the captured visual information may be transmitted using communication modules 230, for example to other computerized devices. In some examples, processing units 220 may control the above processes. For example, processing units 220 may control at least one of: capturing of the visual information, storing the captured visual information, transmitting of the captured visual information, analysis of the captured visual information, and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of computing device 200; measure the velocity of objects in the environment of computing device 200; measure the acceleration of objects in the environment of computing device 200; detect motion of computing device 200; measure the velocity of computing device 200; measure the acceleration of computing device 200; and so forth. In some implementations, the one or more motion sensors 270 may comprise one or more accelerometers configured to detect changes in proper acceleration and/or to measure proper acceleration of computing device 200. In some implementations, the one or more motion sensors 270 may comprise one or more gyroscopes configured to detect changes in the orientation of computing device 200 and/or to measure information related to the orientation of computing device 200. In some implementations, motion sensors 270 may be implemented using image sensors 260, for example by analyzing images captured by image sensors 260 to perform at least one of the following tasks: track objects in the environment of computing device 200; detect moving objects in the environment of computing device 200; measure the velocity of objects in the environment of computing device 200; measure the acceleration of objects in the environment of computing device 200; measure the velocity of computing device 200, for example by calculating the egomotion of image sensors 260; measure the acceleration of computing device 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of computing device 200, to detect changes in the position of computing device 200, and/or to measure the position of computing device 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, a method, such as methods 400, 420, 440, 460, 480, 500, 520, 540, 560, 700, 900, 920 and 940, may comprise one or more steps. In some examples, these methods, as well as all individual steps therein, may be performed by various aspects of end devices 110, server 120, computing device 140, computing device 200, and so forth. For example, a system comprising of at least one processor, such as processing units 220, may perform any of these methods as well as all individual steps therein, for example by processing units 220 executing software instructions stored within memory units 210. In some examples, these methods, as well as all individual steps therein, may be performed by a dedicated hardware. In some examples, computer readable medium, such as a non-transitory computer readable medium, may store data and/or computer implementable instructions for carrying out any of these methods as well as all individual steps therein. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for in the cases described herein. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Some non-limiting examples of image data may include images, grayscale images, color images, 2D images, 3D images, videos, 2D videos, 3D videos, frames, footages, data derived from other image data, and so forth. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array. In some examples, audio data may comprise one or more channels, and each channel may include a stream or a one-dimensional array of values. In one example, calculating a convolution of audio data may include calculating a one dimensional convolution on one or more channels of the audio data. In another example, calculating a convolution of audio data may include stacking arrays from different channels to create a two dimensional array, and calculating a two dimensional convolution on the resulting two dimensional array.

In some examples, objects may be removed from a visual content (for example by the methods, steps and modules described herein). In one example, segmentation data (such as binary mask, alpha matte, probabilistic mask, etc.) of the object in a visual content may be obtained. For example, the segmentation data may be read from memory, received from an external device, received from a user, determined by analyzing the visual content (for example with an object segmentation algorithm), and so forth. Further, the segmentation data may be used to remove the object from the visual data, and the area previously depicting the object in the visual content may be filled, for example using inpainting algorithms, using interpolation algorithms, by stitching another object over it, and so forth. In some examples, an object may be inserted to a visual content (for example by the methods, steps and modules described herein). For example, visual matting algorithms may be used to insert the object to the visual content. In another example, the object may be stitched at a selected position in the visual content using a visual stitching algorithm. In some examples, an object may be moved in a visual content. For example, the object may be removed from its original position in the visual content (for example, as described above), and may be inserted to the visual content at a new positon (for example, as described above), to create the visual motion of the object from the original position to the new position. In some examples, visual appearance of an object may be modified in a visual content. For example, the original depiction of the object may be removed from the visual content (for example, as described above), and a new depiction of the object may be inserted to the visual content (for example, as described above), to create the modification of the visual appearance of the object in the visual content.

It is to be understood that substantially visually similar includes visually identical. For example, two substantially visually similar visual contents may be identical visual contents, two substantially visually similar objects may be identical visual objects, and so forth. It is to be understood that substantially identical includes identical. For example, two substantially identical directions may be identical directions.

In many cases, visual contents used to train a machine learning generative model (for example, as training, validation and/or testing examples) may be associated with different sources (for example, from different contributors, belong to different owners, captured or generated using different tools, and so forth). It may be important to determine contribution of specific visual contents, for example to understand the importance and/or efficiency of the different sources, for crediting, for acquisition and/or generation of new efficient visual contents for further training of the machine learning generative model, or for training of other machine learning models.

Figure 3A:
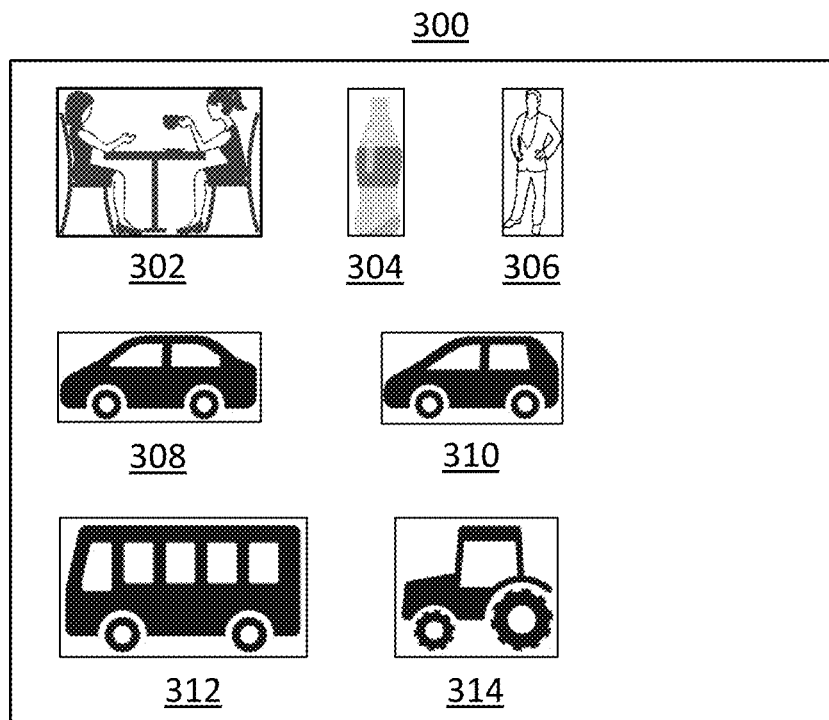
FIGS. 3A and 3B are illustrations of exemplary visual contents.
Figure 3B:
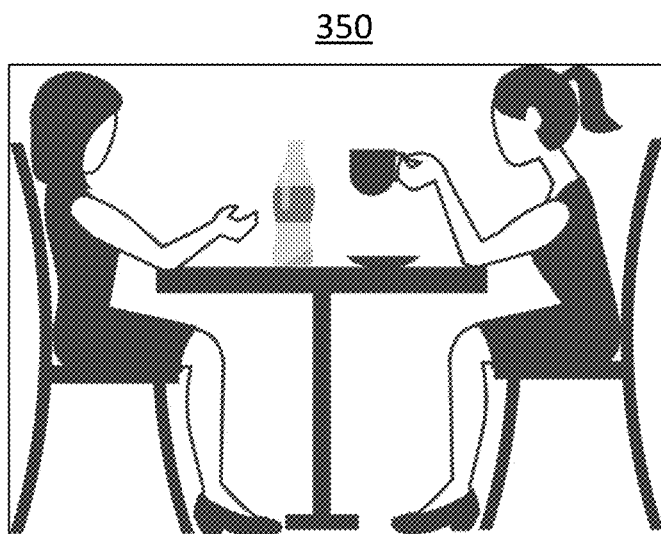

FIGS. 3A and 3B are illustrations of exemplary visual contents. FIG. 3A includes a plurality of visual contents 300 that may be used to train machine learning models, such as generative machine learning models. In this example, the plurality of visual contents 300 may include a visual content 302 of two persons sitting around a table, talking and drinking coffee, visual content 304 of a bottle, visual content 306 of a person standing, visual content 308 of a car, visual content 310 of a different car, visual content 312 of a bus, and visual content 314 of a tractor. In some examples, each visual content of plurality of visual contents 300 may be associated with a label, and a machine learning model may be trained using visual contents 300 and the associated labels, for example as training examples, as validation examples and/or as testing examples. For example, the label may be a discrete value associated with a class (for example, a binary value associated with one of two alternative classes, trinary values associated with one of three alternative classes, etc.), and the machine learning model may be a machine learning classification model. In another example, the label may be a numeric value, and the machine learning model may be a machine learning regression model. In some examples, each visual content of plurality of visual contents 300 may be associated with a textual content, and a machine learning generative model for generating visual output from textual input may be trained using visual contents 300 and the associated textual contents, for example as training examples, as validation examples and/or as testing examples. Some non-limiting examples of such machine learning generative model may include Deep Generative Model (DGM), Generative Adversarial Network model (GAN), auto-regressive model, Variational AutoEncoder model (VAE), transformers based generative models, and so forth. FIG. 3B is an illustration of exemplary visual content 350 generated by a generative model, for example by a machine learning generative model trained using visual contents 300. In this example, visual content 350 may depict two persons sitting around a table, talking and drinking coffee, while a bottle is placed on the table.

FIG. 4A is a flowchart of an exemplary method 400 for attributing generated visual content to training examples. In this example, method 400 may comprise receiving a first visual content generated using a generative model (Step 402), wherein the generative model may be a result of training a machine learning algorithm using a plurality of training examples, and wherein each training example of the plurality of training examples may be associated with a visual content; determining one or more properties of the first visual content (Step 404); for each training example of the plurality of training examples, analyzing the visual content associated with the training example to determine one or more properties of the visual content associated with the training example (Step 406); using the one or more properties of the first visual content and the properties of the visual contents associated with the plurality of training examples to attribute the first visual content to a first subgroup of at least one but not all of the plurality of training examples (Step 408); determining that the at least one visual content associated with the training examples of the first subgroup is associated with a first at least one source (step 410); and for each source of the first at least one source, updating a data-record associated with the source based on the attribution (Step 412).

A non-limiting example of a visual content generated using a generative model is visual content 350. In one example, visual content 350 may be a visual content generated using a generative model, the generative model may be a result of training a machine learning algorithm using a plurality of training examples, and each visual content of the plurality of visual contents 300 may be associated with a training example of the plurality of training examples. In this example, Step 402 may receive visual content 350. Further, Step 404 may determine one or more properties of visual content 350. For example, Step 404 may analyze visual content 350 using an object detection algorithm to determine that visual content 350 depicts two persons sitting around a table and a bottle placed on the table (thereby determining properties of visual content 350). Further, Step 406 may analyze each visual content of visual content 350 to determine one or more properties of the visual content. For example, Step 406 may analyze visual content 302 using an object detection algorithm to determine that visual content 302 depicts two persons sitting around a table (thereby determining properties of visual content 302), and may analyze visual content 304 using an object detection algorithm to determine that visual content 304 depicts a bottle (thereby determining properties of visual content 304). Further, Step 408 may use the one or more properties of visual content 350 (determined by Step 404) and the properties of visual contents 300 (determined by Step 406) to attribute visual content 350 to visual content 302 and visual content 304, but not to visual contents 306, 308, 310, 312 and 314. Further, Step 410 may determine that visual content 302 is associated with a first human contributor and that visual content 304 is an output of a first generative model (and thereby determining that visual content 304 is associated with the first generative model). Further, Step 412 may update a data-record associated with the first human contributor, for example to update a credit included in the data-record and/or to add an indicator of visual content 350 to the data-record. Additionally or alternatively, Step 412 may update a data-record associated with the first generative model, for example to update a credit included in the data-record and/or to add an indicator of visual content 350 to the data-record.

In some examples, Step 402 may comprise receiving a first visual content generated using a generative model. The generative model may be a result of training a machine learning algorithm using a plurality of training examples, and each training example of the plurality of training examples may be associated with a visual content. Some non-limiting example of visual contents that may be associated with such training examples are shown in FIG. 3A (for example, visual content 302, visual content 304, and so forth). In one example, the generative model may be a result of training the machine learning algorithm using the plurality of training examples and additional training examples. Receiving the first visual content, for example by Step 402, may comprise reading the first visual content from memory, may comprise receiving the first visual content from an external device (for example using a digital communication device), may comprise receiving the first visual content from the generative model, may comprise using the generative model to generate the first visual content, and so forth. In one example, the first visual content may include or be at least one of an image, a video, an animation, an illustration or a drawing. In one example, the first visual content may include or be a two-dimensional visual content. In one example, the first visual content may include or be a three-dimensional visual content. In one example, for each training example of the plurality of training examples, the visual content associated with the training example may include or be at least one of an image, a video, an animation, an illustration or a drawing. In one example, for each training example of the plurality of training examples, the visual content associated with the training example may include or be a two-dimensional visual content. In one example, for each training example of the plurality of training examples, the visual content associated with the training example may include or be a three-dimensional visual content.

In some examples, Step 404 may comprise determining one or more properties of the first visual content received by Step 402. In some examples, a machine learning model may be trained using training example to determine properties of images and/or videos. An example of such training example may include a sample image and/or a sample video, together with a label indicating one or more properties of the sample image and/or of the sample video. Step 404 may use the trained machine learning model to analyze the video content and determine the one or more properties of the first visual content. In some examples, a data-structure may associate visual contents with properties, and Step 404 may access the data-structure based on the first visual content to determine the one or more properties of the first visual content. In some examples, a function of pixel values associated with the first visual content may be calculated to thereby determine the one or more properties of the first visual content. Some non-limiting examples of such function may include a linear function, a non-linear function, an exponential function, a polynomial function, a logarithmic function, and so forth. In some examples, Step 404 may calculate a convolution of at least part of the first visual content to thereby obtain a result value of the calculated convolution of the at least part of the first visual content, and may base the determination of the one or more properties of the first visual content on the result value of the calculated convolution of the at least part of the first visual content. For example, when the result value is a first value, Step 404 may determine first values for the one or more properties, and when the result value is a second value, Step 404 may determine second values for the one or more properties. In some examples, Step 404 may base the determination of the one or more properties of the first visual content on an intermediate result of the generative model when generating the first visual content. For example, the generative model may contain layers, where output numerical values of one layer may be used as inputs to the next, and the intermediate result may include at least part of these numerical values. In some examples, Step 404 may analyze the first visual content (for example, using a visual object detection algorithm) to detect at least a first object and a second object depicted in the first visual content, and may base the determination of the one or more properties of the first visual content on a location of the first object in the first visual content and on a location of the second object in the first visual content. For example, Step 404 may base the determination of the one or more properties of the first visual content on the distance between the objects, on a relative orientation between the objects, and so forth. Some non-limiting examples of such object may include an inanimate object, an animate object, a person, and so forth. In some examples, Step 404 may analyze the first visual content (for example, using a visual object recognition algorithm) to determine a type of an object depicted in the first visual content, and may base the determination of the one or more properties of the first visual content on the type of the object. For example, when the type of the object is a first type, Step 404 may determine first values for the one or more properties, and when the type of the object is a second type, Step 404 may determine second values for the one or more properties. The second values may differ from the first values. Some non-limiting examples of such object may include an inanimate object, an animate object, a person, and so forth. In some examples, Step 404 may analyze the first visual content (for example, using a visual event detection algorithm) to detect an event depicted in the first visual content, and may base the determination of the one or more properties of the first visual content on the event. For example, when the event is detected, Step 404 may determine first values for the one or more properties, and when no event is detected, Step 404 may determine second values for the one or more properties. In another example, when the event is detected in a first part of the first visual content, Step 404 may determine first values for the one or more properties, and when the event is detected in a second part of the first visual content, Step 404 may determine second values for the one or more properties. The second values may differ from the first values. In some examples, Step 404 may base the one or more properties of the first visual content on temporal relation between an appearance of a first object and an appearance of a second object in the first visual content. For example, when the first object appears before the second object appears, Step 404 may determine first values for the one or more properties, and when the first object appears after the second object appears, Step 404 may determine second values for the one or more properties. In another example, when the elapsed time between the appearances of the first and second objects is below a selected threshold, Step 404 may determine first values for the one or more properties, and when the elapsed time between the appearances of the first and second objects is above the selected threshold, Step 404 may determine second values for the one or more properties. The second values may differ from the first values. In some examples, the first visual content includes at least a first frame and a second frame, and Step 404 may base the one or more properties of the first visual content on a change in a spatial relation of two objects appearing in the first visual content from the first frame to the second frame. For example, when the two objects move closer together, Step 404 may determine first values for the one or more properties, and when the two objects move further apart from each other, Step 404 may determine second values for the one or more properties. The second values may differ from the first values.

In some examples, Step 406 may comprise, for each training example of the plurality of training examples of Step 402, analyzing the visual content associated with the training example to determine one or more properties of the visual content associated with the training example, for example as described above in relation to Step 404 and the first visual content. In some examples, the training of the machine learning algorithm to generate the generative model may include an iterative process, where in each iteration of the iterative process a training example of the plurality of training examples may be analyzed and a loss function may be updated, and Step 406 may base the one or more properties of the visual content associated with a particular training example on the update to the loss function in an iteration that includes analysis of the particular training example. For example, when the update to the loss function is above a selected threshold, Step 406 may select first values for the one or more properties, and when the update to the loss function is below a selected threshold, Step 406 may select second values for the one or more properties. The second values may differ from the first values. In some examples, Step 406 may determine the one or more properties of a particular visual content associated with a particular training example of the plurality of training examples based on a convolution of at least part of the particular visual content. For example, Step 406 may calculate a convolution of at least part of the particular visual content to thereby obtain a result value of the calculated convolution of the at least part of the particular visual content, and may base the determination of the one or more properties of the particular visual content on the result value. In some examples, Step 406 may determine the one or more properties of a particular visual content associated with a particular training example of the plurality of training examples based on a location of a first object in the particular visual content and on a location of a second object in the particular visual content, for example as described above in relation to Step 404 and the first visual content. In some examples, Step 406 may determine the one or more properties of a particular visual content associated with a particular training example of the plurality of training examples based on a type of an object depicted in the particular visual content, for example as described above in relation to Step 404 and the first visual content. In some examples, Step 406 may determine the one or more properties of a particular visual content associated with a particular training example of the plurality of training examples based on an event depicted in the particular visual content, for example as described above in relation to Step 404 and the first visual content. In some examples, Step 406 may determine the one or more properties of a particular visual content associated with a particular training example of the plurality of training examples based on temporal relation between an appearance of a first object and an appearance of a second object in the particular visual content, for example as described above in relation to Step 404 and the first visual content. For example, when the first object appears before the second object appears, Step 406 may determine first values for the one or more properties, and when the first object appears after the second object appears, Step 406 may determine second values for the one or more properties. In another example, when the elapsed time between the appearances of the first and second objects is below a selected threshold, Step 406 may determine first values for the one or more properties, and when the elapsed time between the appearances of the first and second objects is above the selected threshold, Step 406 may determine second values for the one or more properties. The second values may differ from the first values. In some examples, Step 406 may determine the one or more properties of a particular visual content associated with a particular training example of the plurality of training examples are determined based on a change in a spatial relation of two objects appearing in the particular visual content from a first frame of the particular visual content to a second frame of the particular visual content, for example as described above in relation to Step 404 and the first visual content. For example, when the two objects move closer together, Step 406 may determine first values for the one or more properties, and when the two objects move further apart from each other, Step 406 may determine second values for the one or more properties. The second values may differ from the first values.

In some examples, Step 408 may comprise using the one or more properties of the first visual content determined by Step 404 and the properties of the visual contents associated with the plurality of training examples determined by Step 406 to attribute the first visual content to a first subgroup of at least one but not all of the plurality of training examples. In one example, Step 408 may use method 460 to use the one or more properties of the first visual content determined by Step 404 and the properties of the visual contents associated with the plurality of training examples determined by Step 406 to select the first subgroup. In one example, for each training example in the plurality of training examples, similarity between the one or more properties of the first visual content and the one or more properties of the visual content associated with the training example may be determined, for example using a similarity function, and Step 408 may determine whether to include the training example in the first subgroup. For example, when the similarity is higher than a selected threshold, Step 408 may include the training example in the first subgroup, and when the similarity is lower than a selected threshold, Step 408 may exclude the training examples from the first subgroup. Some non-limiting examples of such similarity function may include a similarity function based on distance, a similarity function based on correlation, a linear similarity function, a non-linear similarity function, an exponential similarity function, and so forth. In one example, a classification machine learning model may be trained using training examples to classify training examples as attributed to a visual content or not based on the properties. An example of such training example may include sample properties of a first sample visual content and sample properties of a second sample visual content, together with a label indicating whether the first sample visual content is attributed to a training example associated with the second sample visual content. Step 408 may use the trained classification machine learning model to determine, for each training example in the plurality of training examples, whether to include the training example in the first subgroup. In some examples, Step 408 may further use the one or more properties of the first visual content determined by Step 404 and the properties (determined by Step 406) of the visual contents associated with the first subgroup of Step 408 to determine, for each training example of the first subgroup, a degree of attribution of the first visual content to the training example. For example, a regression machine learning model may be trained using training examples to determine degree of attributions of visual contents to training examples based on the properties. An example of such training example may include sample properties of a first sample visual content and sample properties of a second sample visual content, together with a label indicating a degree of attribution of the first sample visual content to a training example associated with the second sample visual content. Step 408 may use the trained regression machine learning model to analyze, for each training example of the first subgroup, the properties associated of the first visual content and the properties of the visual content associated with the training example to determine a degree of attribution of the first visual content to the training example.

In some examples, Step 404 may calculate a convolution of at least part of the first visual to obtain a result value of the convolution of at least part of the first visual, thereby obtaining a property of the first visual content. Further, for each training example of the plurality of training examples of Step 402, Step 406 may calculate a convolution of at least part of the visual content associated with the training example to obtain a result value of the at least part of the visual content associated with the training example, thereby obtaining a property of the visual content associated with the training example. Further, Step 408 may use the result value of the convolution of at least part of the first visual and the result value of the at least part of the visual content associated with the training example to attribute the first visual content to a first subgroup of at least one but not all of the plurality of training examples.

In some examples, the training of the machine learning algorithm to generate the generative model of Step 402 may include a first step of training using a first subgroup of the plurality of training examples of Step 402 to obtain an intermediate model and a second step of training using a second subgroup of the plurality of training examples of Step 402 and using the intermediate model for initialization to obtain the generative model. In one example, the second subgroup may differ from the first subgroup. In one example, the first subgroup and the second subgroup may be identical. In one example, the first subgroup and the second subgroup may have no training examples in common, may have at least one training example in common, and so forth. In one example, the training of the machine learning algorithm to generate the generative model of Step 402 may include more than two steps. In some examples, Step 408 may compare a result associated with the first visual content and the intermediate model with a result associated with the first visual content and the generative model. For example, the intermediate model may be evaluated for the first visual content by using the first visual content as input to the intermediate model to obtain an output of the intermediate model, thereby obtaining the result associated with the first visual content and the intermediate model. Further, the generative model may be evaluated for the first visual content by using the first visual content as input to the generative model to obtain an output of the generative model, thereby obtaining the result associated with the first visual content and the generative model. In some examples, for each training example of the second subgroup, Step 408 may determine whether to attribute the first visual content to the training example based on a result of the comparison. For example, in response to a first result, Step 408 may attribute the first visual content to a first training example and may avoid attributing the first visual content to a second training example, and in response to a second result, Step 408 may attribute the first visual content to the second training example and may avoid attributing the first visual content to the first training example. In one example, in response to a third result, Step 408 may attribute the first visual content to both the first training example and the second training example. In one example, in response to a fourth result, Step 408 may avoid attributing the first visual content to both the first training example and the second training example.

In some examples, Step 410 may comprise determining that the at least one visual content associated with the training examples of the first subgroup (of Step 408) is associated with a first at least one source. For example, Step 410 may access a data-structure associating training examples with sources based on the training examples of the first subgroup to identify sources associated with the training examples of the first subgroup and thereby determine the first at least one source. In another example, Step 410 may analyze the at least one visual content associated with the training examples of the first subgroup to identify sources associated with the training examples of the first subgroup and thereby determine the first at least one source. For example, a visual content may include a signature of an artist, and the analysis of the visual content may detect the signature to identify the artist and thereby identify a source.

In some examples, Step 412 may comprise, for each source of the first at least one source of Step 410, updating a data-record associated with the source based on the attribution. For example, the data-record may be stored in memory (such as a digital memory), and Step 412 may update data associated with the data-record in the memory. In another example, the data-record may be maintained by an external device, and Step 412 may transmit information to the external device (for example, using a digital communication device) to cause the external device to update the data-record. In yet another example, the data-record may include data in a database, and Step 412 may update the data in the database. In one example, Step 412 may update the data-record to record the attribution. In one example, Step 412 may update the data-record to include an encoding (such as a digital encoding) of information associated with at least one of the attribution, the first visual content received by Step 402, the one or more properties of the first visual content determined by Step 404, the first subgroup of Step 408, or the at least one visual content associated with the first subgroup of Step 408. In some examples, for each source of the first at least one source, Step 412 may further base the update to the data-record associated with the source on a degree of attribution associated with the source, such as the degree of attribution associated with the source determined by Step 408. For example, the degree of attribution may be a number in a range of numbers, may be a discrete value, may be a level (such as 'high', 'medium' and 'low'), and so forth. In one example, the degree of attribution associated with the source may be recorded in the data-record. In another example, a value in the data-record may be updated to a new value determined by calculating a function of the value and the degree of attribution associated with the source. Some non-limiting examples of such function may include a linear function, a non-linear function, an exponential function, a polynomial function, a logarithmic function, and so forth. In some examples, a value in the data-record may represent a credit associated with the source, and Step 412 may update the credit associated with the source (and therefore the value in the data-record) based on the attribution and/or the degree of attribution.

FIG. 4B is a flowchart of an exemplary method 420 for attributing generated visual content to training examples and selecting visual content for specific usage based on the attribution. In this example, method 420 may comprise receiving a second visual content generated using the generative model (Step 422); determining one or more properties of the second visual content (Step 424); using the one or more properties of the second visual content and the properties of the visual contents associated with the plurality of training examples to attribute the second visual content to a second subgroup of at least one but not all of the plurality of training examples (Step 426), where the second subgroup may include at least one training example not included in the first subgroup; determining that the at least one visual content associated with the training examples of the second subgroup is associated with a second at least one source (Step 428), where the second at least one source may include one or more sources not included in the first at least one source; based on the second at least one source, forgoing usage of the second visual content (Step 430); and initiating usage of the first visual content (Step 432).

In some examples, Step 422 may comprise receiving a second visual content generated using a generative model (for example, the generative model of Step 402, a generative model different from the generative model of Step 402 and trained using the plurality of training examples of Step 402, and so forth), for example as described above in relation to Step 402 and the first visual. In some examples, Step 424 may comprise determining one or more properties of the second visual content received by Step 422, for example as described above in relation to Step 404 and the first visual content. In some examples, Step 426 may comprise using the one or more properties of the second visual content determined by Step 424 and the properties (determined by Step 406) of the visual contents associated with the plurality of training examples to attribute the second visual content to a second subgroup of at least one but not all of the plurality of training examples of Step 402, for example as described above in relation to Step 408, the first visual content and the first subgroup of at least one but not all of the plurality of training examples. In one example, the second subgroup may include at least one training example not included in the first subgroup. In one example, the first subgroup may include at least one training example not included in the second subgroup. In one example, the first subgroup and the second subgroup may be have no training example in common, may have at least one training example in common, and so forth. In one example, the first subgroup may be identical to the second subgroup. In some examples, Step 428 may comprise determining that the at least one visual content associated with the training examples of the second subgroup is associated with a second at least one source, for example as described above in relation to Step 410, the first subgroup and the first at least one source. In one example, the second at least one source may include one or more sources not included in the first at least one source. In one example, the first at least one source may include one or more sources not included in the second at least one source. In one example, the first at least one source and the second at least one source may have no source in common, may have at least one source in common, and so forth. In one example, the second at least one source may be identical to the first at least one source.

In some examples, Step 430 may comprise forgoing usage of the second visual content, for example based on the second at least one source. For example, forgoing the usage may include avoiding storing specific digital information that when stored cause a usage of the second visual content by another process. In another example, forgoing the usage may include avoiding transmission of a specific digital signal to an external device, the specific digital signal causes, when transmitted to the external device, the external device to usage the second visual content. In yet another example, forgoing the usage may include avoiding presentation of the second visual content. In an additional example, forgoing the usage may include avoiding may include avoiding insertion of the second visual content to a publication. In one example, Step 430 may forgo usage of the second visual content in response to one or more sources of the second at least one source being included in a selected group of sources. In an additional example, Step 430 may forgo usage of the second visual content in response on a cost associated with the second visual content based on the second at least one source. In yet another example, Step 430 may forgo usage of the second visual content in response to a cost associated with the second visual content based on the second at least one source is higher than a cost associated with the first visual content based on the first at least one source. For example, Step 430 may determine a cost associated with the first visual content based on the first at least one source, may determine a cost associated with the second visual content based on the second at least one source, and may compare the determined cost associated with the first visual content with the determined cost associated with the second visual content. In one example, Step 430 may determine to forgo usage of the second visual content based on a result of the comparison. In one example, Step 432 may determine to initiating usage of the first visual content based on a result of the comparison.

In some examples, Step 432 may comprise initiating usage of the first visual content. For example, digital information may be stored in memory to cause a usage of the first visual content by another process. In another example, digital signal may be transmitted to an external device (for example using a digital communication device) to cause the external device to use the first visual content. In yet another example, the first visual content may be visually presented to an individual, for example via a user interface. In an additional example, the first visual content may be included in a publication, may be included in a website, may be included in a user interface, and so forth.

FIG. 4C is a flowchart of an exemplary method 440 for attributing generated visual content to training examples and selecting visual content for specific usage based on the attribution. In this example, method 440 may comprise receiving a second visual content generated using the generative model (Step 422); determining one or more properties of the second visual content (Step 424); using the one or more properties of the second visual content and the properties of the visual contents associated with the plurality of training examples to attribute the second visual content to a second subgroup of at least one but not all of the plurality of training examples (Step 426), where the second subgroup may include at least one training example not included in the first subgroup; receiving a second visual content generated using the generative model (Step 422); determining one or more properties of the second visual content (Step 424); using the one or more properties of the second visual content and the properties of the visual contents associated with the plurality of training examples to attribute the second visual content to a second subgroup of at least one but not all of the plurality of training examples (Step 426), where the second subgroup may include at least one training example not included in the first subgroup; accessing a data-structure associating visual contents with amounts (Step 448); using the data-structure to determine that the at least one visual content associated with the training examples of the first subgroup is associated a first total amount (Step 450); using the data-structure to determine that the at least one visual content associated with the training examples of the second subgroup is associated a second total amount (Step 452); based on the first and second total amounts, forgoing usage of the second visual content and initiating usage of the first visual content (Step 454); and further basing the updates to data-records associated with the sources by Step 412 on the first total amount (Step 456).

In some examples, Step 448 may comprise accessing a data-structure associating visual contents with amounts. For example, accessing the data-structure associating visual contents with amounts may comprise accessing a memory containing the data-structure, may comprise communicating with an external device maintaining the data-structure, may comprise accessing a database implementing the data-structure, and so forth.

In some examples, Step 450 may comprise using the data-structure access by Step 458 to determine that the at least one visual content associated with the training examples of the first subgroup of Step 408 is associated a first total amount. For example, the first total amount may be an amount associated with the at least one visual content in the data-structure, may be a sum of amounts associated with the at least one visual content in the data-structure, may be a function of the amounts associated with the at least one visual content in the data-structure (such as a linear function, a non-linear function, a polynomial function, an exponential function, etc.), and so forth.

In some examples, Step 452 may comprise using the data-structure to determine that the at least one visual content associated with the training examples of the second subgroup is associated a second total amount, for example as described above in relation to Step 450, the at least one visual content associated with the training examples of the first subgroup, and the first total amount.

In some examples, Step 454 may comprise, for example based on the first and second total amounts determined by Step 450 and Step 452, forgoing usage of the second visual content (for example, as described above in relation to Step 430) and initiating usage of the first visual content (for example, as described above in relation to Step 432).

In some examples, Step 456 may comprise further basing the updates of Step 412 to data-records associated with the sources on the first total amount. For example, the first total amount may be recorded in at least one the data-records. In another example, the value in the data-record may be updated to a new value determined by calculating a function of the value and the first total amount. Some non-limiting examples of such function may include a linear function, a non-linear function, an exponential function, a polynomial function, a logarithmic function, and so forth.

FIG. 4D is a flowchart of an exemplary method 460 for attributing generated visual content to training examples. In this example, method 460 may comprise using the one or more properties of the first visual content to embed the first visual content in a mathematical space (Step 462); for each training example of the plurality of training examples, using the one or more properties of the visual content associated with the training example to embed the visual content associated with the training example in the mathematical space (Step 464); and using the mathematical space to select the first subgroup of at least one but not all of the plurality of training examples (Step 466).

In some examples, Step 462 may comprise using the one or more properties of the first visual content determined by Step 404 to embed the first visual content in a mathematical space. For example, a function of the first visual content may be calculated to thereby determine the mathematical object associated with the first visual content in the mathematical space. For example, the function may be a function of pixel values of the first visual content, may be a function of voxels of the first visual content, may be a function of low-level features of the first visual content, may be a function of the one or more properties of the first visual content determined by Step 404, and so forth. Some non-limiting examples of such function may include a linear function, a non-linear function, an exponential function, a polynomial function, a logarithmic function, and so forth. In another example, each mathematical object in the mathematical space may corresponds to a visual content, and the mathematical object corresponding to the first visual content may be the embedding of the first visual content in the mathematical space. The mathematical object may be determined based on a mapping, may be determined using a data-structure associating mathematical objects with visual contents, and so forth.

In some examples, Step 464 may comprise, for each training example of the plurality of training examples, using the one or more properties of the visual content associated with the training example determined by Step 406 to embed the visual content associated with the training example in the mathematical space, for example as described above in relation to Step 462 and the first visual content.

In some examples, Step 466 may comprise, using the mathematical space to select the first subgroup of at least one but not all of the plurality of training examples. For example, one or more regions of the mathematical space may be selected based on the mathematical object corresponding to the first visual content determined by Step 462. Some non-limiting examples of such region may include a manifold, a subspace, a geometrical region, and so forth. In on example, the selected region may include a spherical region centered around the mathematical object corresponding to the first visual content, a convex hull of the mathematical object corresponding to the first visual content and two or more other selected mathematical objects, and so forth. In one example, the mathematical object corresponding to the first visual content may be a region of the mathematical space by itself, and the selected region may be the mathematical object. In one example, Step 466 may include all training examples associated with visual contents corresponding to mathematical objects (as determined by Step 464) in a first selected region of the mathematical space in the first subgroup. In another example, Step 466 may exclude all training examples associated with visual contents corresponding to mathematical objects (as determined by Step 464) in a second selected region of the mathematical space from the first subgroup.

FIG. 4E is a flowchart of an exemplary method 480 for attributing generated visual content to training examples. In this example, method 480 may comprise using a parameter of the generative model and the properties of the visual contents associated with the plurality of training examples to attribute the parameter of the generative model to a second subgroup of at least one but not all of the plurality of training examples (Step 482); determining that the at least one visual content associated with the training examples of the second subgroup is associated with a second at least one source (Step 484); and for each source of the second at least one source, updating a data-record associated with the source based on the attribution of the parameter of the generative model (Step 486).

In some examples, Step 482 may comprise using a parameter of the generative model of Step 402 and the properties of the visual contents associated with the plurality of training examples determined by Step 406 to attribute the parameter of the generative model to a second subgroup of at least one but not all of the plurality of training examples. In one example, the second subgroup and the first subgroup may be the identical. In another example, the second subgroup may differ from the first subgroup. In one example, a classification machine learning model may be trained using training examples to classify parameters of generative models as attributed to a visual content or not based on the properties of the visual content. An example of such training example may include a sample value of a sample parameter of a sample generative model and sample properties of a sample visual content, together with a label indicating whether the sample parameter is attributed to a training example associated with the sample visual content. Step 482 may use the trained classification machine learning model to determine, for each training example in the plurality of training examples, whether to include the training example in the second subgroup. In some examples, Step 482 may further use the parameter of the generative model of Step 402 and the properties (determined by Step 406) of the visual contents associated with the second subgroup of Step 482 to determine, for each training example of the second subgroup, a degree of attribution of the parameter to the training example. For example, a regression machine learning model may be trained using training examples to determine degree of attributions of parameters of generative models to training examples based on the properties of the visual contents associated with the training examples. An example of such training example may include a sample value of a sample parameter of a sample generative model and sample properties of a second sample visual content, together with a label indicating a degree of attribution of the sample parameter to a training example associated with the second sample visual content. Step 482 may use the trained regression machine learning model to analyze, for each training example of the second subgroup, the and the parameter of the generative model of Step 402 and the properties of the visual content associated with the training example to determine a degree of attribution of the parameter to the training example.

In some examples, Step 484 may comprise determining that the at least one visual content associated with the training examples of the second subgroup (of Step 482) is associated with a second at least one source, for example as described above in relation to Step 410, the first subgroup and the first at least one source. In some examples, Step 486 may comprise, for each source of the second at least one source, updating a data-record associated with the source based on the attribution of the parameter of the generative model, for example as described above in relation to Step 412 and the first at least one source. In one example, Step 486 may update the data-record to record the attribution. In one example, Step 486 may update the data-record to include an encoding (such as a digital encoding) of information associated with at least one of the attribution, the parameter, the generative model of Step 402, the second subgroup of Step 482, or the at least one visual content associated with the second subgroup of Step 482. In some examples, for each source of the first at least one source, Step 486 may further base the update to the data-record associated with the source on a degree of attribution associated with the source, such as the degree of attribution associated with the source determined by Step 484. For example, the degree of attribution may be a number in a range of numbers, may be a discrete value, may be a level (such as 'high', 'medium' and 'low'), and so forth. In one example, the degree of attribution associated with the source may be recorded in the data-record. In another example, a value in the data-record may be updated to a new value determined by calculating a function of the value and the degree of attribution associated with the source. Some non-limiting examples of such function may include a linear function, a non-linear function, an exponential function, a polynomial function, a logarithmic function, and so forth. In some examples, a value in the data-record may represent a credit associated with the source, and Step 486 may update the credit associated with the source (and therefore the value in the data-record) based on the attribution and/or the degree of attribution.

An inference model may be a result of training a machine learning algorithm using a plurality of training examples, for example as described above. In many cases, the inference model may be distributed and/or used without revealing at least some of the training examples used to train the machine learning algorithm. It may be important to determine whether specific visual contents where used to train the machine learning algorithm, for example to understand the importance and/or efficiency of the different visual contents, for crediting, for acquisition and/or generation of new efficient visual contents for further training of the machine learning model, or for training of other machine learning models.

FIG. 5A is a flowchart of an exemplary method 500 for identifying visual contents used for training of inference models. In this example, method 500 may comprise receiving a specific visual content (Step 502); accessing data based on at least one parameter of an inference model (Step 504), the inference model may be a result of training a machine learning algorithm using a plurality of training examples, each training example of the plurality of training examples may include a visual content; analyzing the data and the specific visual content to determine a likelihood that the specific visual content is included in at least one training example of the plurality of training examples (Step 506); and generating a digital signal indicative of the likelihood that the specific visual content is included in at least one training example of the plurality of training examples (Step 508).

Figure 6A:
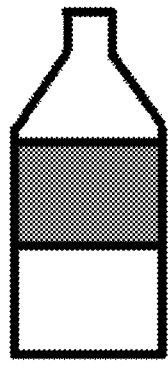
FIGS. 6A, 6B, 6C and 6D are illustrations of exemplary visual contents.
Figure 6B:
Figure 6C:
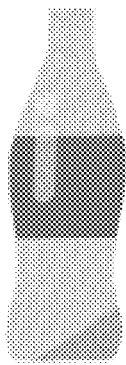

In one example, Step 502 may receive the visual content of FIG. 6C, and Step 504 may receive data based on at least one parameter of a generative model trained using visual contents 300 as training examples, without receiving direct access to visual contents 300. Further, Step 506 may analyze the visual content of FIG. 6C and the data to determine that the visual content of FIG. 6C is likely included in at least one training example of visual contents 300. Further, Step 508 may generate a digital signal including an indication of the determination that the visual content of FIG. 6C is likely included in at least one training example of visual contents 300. In another example, Step 502 may receive the visual content of FIG. 6A, and Step 504 may receive data based on at least one parameter of a generative model trained using visual contents 300 as training examples, without receiving direct access to visual contents 300. Further, Step 506 may analyze the visual content of FIG. 6A and the data to determine that the visual content of FIG. 6A is likely not included in at least one training example of visual contents 300. Further, Step 508 may generate a digital signal including an indication of the determination that the visual content of FIG. 6A is likely not included in at least one training example of visual contents 300.

In some examples, Step 502 may comprise receiving a specific visual content. Receiving the specific visual content, for example by Step 502, may comprise reading the specific visual content from memory, may comprise receiving the specific visual content from an external device (for example using a digital communication device), may comprise receiving the specific visual content from the generative model, may comprise using the generative model to generate the specific visual content, and so forth. In one example, the specific visual content may include or be at least one of an image, a video, an animation, an illustration or a drawing. In one example, the specific visual content may include or be a two-dimensional visual content. In one example, the specific visual content may include or be a three-dimensional visual content. In one example, Step 502 may access a stock photography repository to obtain the specific visual content. In one example, the specific visual content may include at least part of a frame of a video. In one example, the specific visual content may include a plurality of frames of a video. In one example, the specific visual content may include a still image.

In some examples, Step 504 may comprise accessing data based on at least one parameter of an inference model. The inference model may be a result of training a machine learning algorithm using a plurality of training examples. Each training example of the plurality of training examples may include a visual content. Accessing data based on at least one parameter of the inference model, for example using Step 504, may comprise accessing the data in a digital memory, may comprise communicating with an external device that holds the data (for example, using a digital communication device), may comprise using the at least one parameter to determine the data, may comprise using the inference model (and thereby using the at least one parameter) to determine the data, and so forth. In one example, Step 504 may determine the data using method 520. In one example, the data based on at least one parameter of the inference model may be a value of the parameter. In another example, the data based on at least one parameter of the inference model may be a function of the value of the parameter. Some non-limiting examples of such function may include a linear function, a non-linear function, an exponential function, a polynomial function, a logarithmic function, and so forth. In yet another example, the data based on at least one parameter of the inference model may be, or may be based on, one or more outputs of the inference model. In one example, the at least one parameter of the inference model may include at least one threshold of the inference model. In one example, the at least one parameter of the inference model may include at least a weight of a regularization term of the inference model. In one example, the at least one parameter of the inference model may include a weight of the inference model. In one example, the at least one parameter of the inference model may include at least one of a number of layers of the inference model, a type of at least one neuron of the inference model, an indication of a structure of the inference model (for example, in a form of a graph), a type of regulation of the inference model, or a width of at least one layer of the inference model. In some examples, the inference model may be a generative model. Further, for each training example of the plurality of training examples, the visual content included in the training example may be or include a pair of visual contents, an input visual content and a desired output visual content. In another example, for each training example of the plurality of training examples, the visual content included in the training example may be or include at least one of an input visual content or a desired output visual content.

In some examples, Step 504 may use the specific visual content received by Step 502 and the at least one parameter of the inference model to obtain an output of the inference model corresponding to the specific visual content. For example, the inference model may be evaluated (using the at least one parameter) with the specific visual content used as input to the inference model to obtain the output. In some examples, Step 504 may base the data on the output of the inference model corresponding to the specific visual content. For example, when the obtained output is a first output, Step 504 may select first values for the data, and when the obtained output is a second output, Step 504 may select second values for the data. In another example, the data may be or include the obtained output. In yet another example, the data may be a function of the obtained output. Some non-limiting examples of such function may include a linear function, a non-linear function, an exponential function, a polynomial function, a logarithmic function, and so forth.

In some examples, Step 504 may use the specific visual content received by Step 502 and the at least one parameter of the inference model to obtain a gradient corresponding to the specific visual content. For example, a function may be selected based on the at least one parameter (for example, the at least one parameter may be parameters to select the function of a family of functions), and a gradient of the selected function at the specific visual content may be calculated or estimated. In one example, the selected function may be the inference model. In some examples, Step 504 may base the data on the gradient corresponding to the specific visual content. For example, when the gradient is a first gradient, Step 504 may select first values for the data, and when the gradient is a second gradient, Step 504 may select second values for the data. In another example, the data may be or include the gradient. In yet another example, the data may be a function of the gradient. Some non-limiting examples of such function may include a linear function, a non-linear function, an exponential function, a polynomial function, a logarithmic function, and so forth.

In some examples, Step 504 may use the specific visual content received by Step 502 and the at least one parameter of the inference model to calculate a loss corresponding to the specific visual content and to a loss function associated with the machine learning algorithm. For example, the inference model may be evaluated (using the at least one parameter) with the specific visual content used as input to the inference model to obtain an output of the inference model, and the loss function may be evaluated when the output of the inference model is used as input of the loss function, thereby calculating the loss. In some examples, Step 504 may base the data on the loss corresponding to the specific visual content and to the loss function. For example, when the loss is a first loss, Step 504 may select first values for the data, and when the loss is a second loss, Step 504 may select second values for the data. In another example, the data may be or include the loss. In yet another example, the data may be a function of the loss. Some non-limiting examples of such function may include a linear function, a non-linear function, an exponential function, a polynomial function, a logarithmic function, and so forth.

In some examples, Step 506 may comprise analyzing the data accessed by Step 504 and the specific visual content received by Step 502 to determine a likelihood that the specific visual content is included in at least one training example of the plurality of training examples of Step 504. For example, the likelihood may be a binary likelihood, a likelihood in a selected range of likelihoods (such as a continuous range of likelihoods), a level of likelihood (such as 'High', Medium', 'Low', etc.), and so forth. In one example, the likelihood may be a binary likelihood, and determining the likelihood that the specific visual content is included in at least one training example of the plurality of training examples by Step 506 includes determining whether the specific visual content is included in at least one training example of the plurality of training examples. In one example, a classification machine learning model may be trained using training examples to classify, based on the properties and data, visual contents as included in training examples associated with inference models or not. An example of such training example may include sample properties of a sample visual content and sample data associated with a sample parameter of a sample inference model, together with a label indicating whether the sample visual content is associated with a training example used to train a machine learning algorithm to obtain the sample inference model. Step 506 may use the trained classification machine learning model to analyze the data accessed by Step 504 and the specific visual content received by Step 502 and determine a binary likelihood that the specific visual content is included in at least one training example of the plurality of training examples of Step 504 (i.e., determining whether the specific visual content is included or is not included in at least one training example of the plurality of training examples). In one example, a regression machine learning model may be trained using training examples to determine likelihoods that visual contents are included in training examples associated with inference models based on properties. An example of such training example may include sample properties of a sample visual content and sample data associated with a sample parameter of a sample inference model, together with a label indicating a likelihood that the sample visual content is associated with a training example used to train a machine learning algorithm to obtain the sample inference model. Step 506 may use the trained regression machine learning model to analyze the data accessed by Step 504 and the specific visual content received by Step 502 and determine the likelihood that the specific visual content is included in at least one training example of the plurality of training examples of Step 504.

In some examples, Step 508 may comprise generating a digital signal indicative of the likelihood (determined by Step 506) that the specific visual content is included in at least one training example of the plurality of training examples. For example, the digital signal may include an encoding of the likelihood. In another example, Step 508 may calculate a function of the likelihood to obtain an output value, and the digital signal may include the output value. Some non-limiting examples of such function may include a linear function, a non-linear function, an exponential function, a polynomial function, a logarithmic function, and so forth. In one example, the digital signal may be transmitted to an external device using a digital communication device. In another example, the digital signal may cause storage of the likelihood or of information based on the likelihood in a digital memory. In yet another example, the digital signal may cause a presentation of the likelihood or of information based on the likelihood (for example, a visual presentation via a user interface, an audible presentation, a graphical presentation, a textual presentation, and so forth). In some examples, a data structure associating visual contents with sources may be accessed to determine that the specific visual content is associated with a specific source, for example as described above in relation to Step 410. Further, Step 508 may include an indication of the specific source in the generated digital signal.

Additionally or alternatively, the data accessed by Step 504 and the specific visual content received by Step 502 may be analyzed to determine a likelihood that an augmented version of the specific visual content is included in at least one training example of the plurality of training examples. For example, an augmented version of a particular visual content may be any visual content that may be obtained by recursively applying, at most a selected number of times, augmentation functions of a selected group of augmentation functions on the particular visual content. In another example, an augmented version of a particular visual content may be any visual content that is similar to the particular visual content based on a selected similarity function (for example, a certain visual content may be similar to the particular visual content when the similarity between the particular visual content and the certain visual content is above a selected threshold). In yet another example, an augmented version of a particular visual content may be any visual content that is less than a selected distance from the particular visual content based on a selected dissimilarity function. In one example, the likelihood may be a binary likelihood, a likelihood in a selected range of likelihoods (such as a continuous range of likelihoods), a level of likelihood (such as 'High', Medium', 'low', etc.), and so forth. In one example, the likelihood may be a binary likelihood, and determining the likelihood that an augmented version of the specific visual content is included in at least one training example of the plurality of training examples includes determining whether an augmented version of the specific visual content is included in at least one training example of the plurality of training examples. In one example, a classification machine learning model may be trained using training examples to classify, based on the properties and data, visual contents as ones that an augmented version of them is included in training examples associated with inference models or not. An example of such training example may include sample properties of a sample visual content and sample data associated with a sample parameter of a sample inference model, together with a label indicating whether an augmented version of the sample visual content is associated with a training example used to train a machine learning algorithm to obtain the sample inference model. The trained classification machine learning model may be used to analyze the data accessed by Step 504 and the specific visual content received by Step 502 and determine a binary likelihood that an augmented version of the specific visual content is included in at least one training example of the plurality of training examples of Step 504 (i.e., determining whether an augmented version of the specific visual content is included in at least one training example of the plurality of training examples, or whether no augmented version of the specific visual content is included in at least one training example of the plurality of training examples). In one example, a regression machine learning model may be trained using training examples to determine likelihoods that visual contents are as ones that an augmented version of them is included in training examples associated with inference models based on properties. An example of such training example may include sample properties of a sample visual content and sample data associated with a sample parameter of a sample inference model, together with a label indicating a likelihood that an augmented version of the sample visual content is associated with a training example used to train a machine learning algorithm to obtain the sample inference model. The trained regression machine learning model may be used to analyze the data accessed by Step 504 and the specific visual content received by Step 502 and determine the likelihood that an augmented version of the specific visual content is included in at least one training example of the plurality of training examples of Step 504. In some examples, a second digital signal indicative of the likelihood that an augmented version of the specific visual content is included in at least one training example of the plurality of training examples may be generated. For example, the second digital signal may include an encoding of the likelihood. In another example, a function of the likelihood may be calculated to obtain an output value, and the second digital signal may include the output value. Some non-limiting examples of such function may include a linear function, a non-linear function, an exponential function, a polynomial function, a logarithmic function, and so forth. In one example, the second digital signal may be transmitted to an external device using a digital communication device. In another example, the second digital signal may cause storage of the likelihood or of information based on the likelihood in a digital memory. In yet another example, the second digital signal may cause a presentation of the likelihood or of information based on the likelihood (for example, a visual presentation via a user interface, an audible presentation, a graphical presentation, a textual presentation, and so forth).

Additionally or alternatively, the data accessed by Step 504 and the specific visual content received by Step 502 may be analyzed to determine a measure of similarity of the specific visual content to a selected training example of the plurality of training examples of Step 504. It is understood that a measure of dissimilarity is also a measure of similarity. It is understood that a distance is also a measure of similarity. It is understood that a correlation is also a measure of similarity. In one example, the measure of similarity may be indicative of an amount of augmentation. In one example, the selected training example of the plurality of training examples may be the most similar and/or closest training example in the plurality of training examples to the specific visual content. In another example, the selected training example may be a training example associated with a specific source. In yet another example, the selected training example may be a training example associated with an impact on the inference model that is above a selected threshold. For example, the impact may be determined based on amount of change the training example caused to an intermediate inference model while training. In one example, a regression machine learning model may be trained using training examples to determine similarities between visual contents and training examples used to train inference models. An example of such training example may include a sample visual content and sample data associated with a sample inference model, together with a label indicating a similarity of the sample visual content to selected training examples used to train the inference model. The regression machine learning model may be used to analyze the data accessed by Step 504 and the specific visual content received by Step 502 to determine the measure of similarity of the specific visual content to a selected training example of the plurality of training examples of Step 504. In some examples, a second digital signal indicative of the measure of similarity of the specific visual content to the selected training example of the plurality of training examples may be generated. For example, the second digital signal may include an encoding of the similarity. In another example, a function of the similarity may be calculated to obtain an output value, and the second digital signal may include the output value. Some non-limiting examples of such function may include a linear function, a non-linear function, an exponential function, a polynomial function, a logarithmic function, and so forth. In yet another example, the second digital signal may be indicative of the selected training example of the plurality of training examples. In one example, the second digital signal may be transmitted to an external device using a digital communication device. In another example, the second digital signal may cause storage of the similarity or of information based on the similarity in a digital memory. In yet another example, the second digital signal may cause a presentation of the similarity or of information based on the similarity (for example, a visual presentation via a user interface, an audible presentation, a graphical presentation, a textual presentation, and so forth).

FIG. 5B is a flowchart of an exemplary method 520 for identifying visual contents used for training of inference models. In this example, method 520 may comprise using the specific visual content to generate a plurality of variations of the specific visual content (Step 522); for each variation of the plurality of variations, using the variation and the at least one parameter of the inference model to obtain an output of the inference model corresponding to the variation (Step 524); and basing the data on the outputs of the inference model corresponding to the plurality of variations (Step 526).

In some examples, Step 522 may comprise using the specific visual content received by Step 502 to generate a plurality of variations of the specific visual content. In one example, Step 522 may use method 540 to generate the plurality of variations of the specific visual content. In one example, an augmentation technique may be applied to obtain a variation of the specific visual content from the specific visual content. A non-limiting example of such augmentation technique may include at least one of rotation, shift, shear, flip, noising, blurring, additions of objects, removal of objects, crop, inverse-order frame, upsampling, downsampling, frame mirroring, frame skipping, augmentation using a generative model to alter the original visual content, and so forth. In one example, an augmentation technique may include exactly one of the above mentioned techniques. In another example, an augmentation technique may include two or more of the above mentioned techniques, applied one after another in a selected order. In some examples, Step 522 may selecting a plurality of objects where no object of the plurality of objects is depicted in the specific visual content received by Step 502. For example, Step 522 may analyze the specific visual content received by Step 502 using an object recognition algorithm to determine the objects depicted in the specific visual content, and may select the plurality of objects to include objects that are not in the specific visual content of a group of three or more alternative objects. Further, Step 522 may, for each object in the plurality of objects, analyzing the specific visual content received by Step 502 to generate a variation of the specific visual content that includes a depiction of the object (for example, using a visual object stitching algorithm, using a visual matting algorithm, etc.), thereby generating the plurality of variations of the specific visual content. In some examples, Step 522 may analyze the specific visual content received by Step 502 to detect a plurality of objects depicted in the specific visual content, for example using an object detection algorithm. Further, Step 522 may, for each object in the plurality of objects, analyze the specific visual content to generate a variation of the specific visual content that do not include a depiction of the object, thereby generating the plurality of variations of the specific visual content. For example, the pixels depicting the object in the specific visual content may be identified using a semantic segmentation algorithm, the pixels depicting the object may be erased, and an inpainting algorithm may be used to determine new values for the erased pixels.

In some examples, Step 524 may comprise, for each variation of the plurality of variations (of Step 522), using the variation and the at least one parameter of the inference model of Step 504 to obtain an output of the inference model corresponding to the variation. For example, the inference model may be evaluated (using the at least one parameter) with the variation as an input to obtain the output of the inference model corresponding to the variation.

In some examples, Step 526 may comprise basing the data of Step 504 on the outputs (obtained by Step 524) of the inference model corresponding to the plurality of variations. For example, when the outputs obtained by Step 524 are first outputs, Step 526 may select first values for the data of Step 504, and when the outputs obtained by Step 524 are second outputs, Step 526 may select second values for the data of Step 504. In another example, the data of Step 504 may be or include the outputs obtained by Step 524. In yet another example, the data of Step 504 may be a function of the outputs obtained by Step 524. Some non-limiting examples of such function may include a linear function, a non-linear function, an exponential function, a polynomial function, a logarithmic function, and so forth. In an additional example, a machine learning model may be trained to generate data based on outputs. An example of such training example may include sample outputs, together with a label indicating a desired generated data for the sample outputs. Step 526 may use the trained machine learning model to analyze the outputs obtained by Step 524 and generate the data of Step 504.

FIG. 5C is a flowchart of an exemplary method 540 for identifying visual contents used for training of inference models. In this example, method 540 may comprise obtaining a plurality of directions in a mathematical space (Step 542); obtaining a specific mathematical object in the mathematical space corresponding to the specific visual content (Step 544); for each direction of the plurality of directions, using the specific mathematical object and the direction to determine a mathematical object in the mathematical space corresponding to the specific mathematical object and the direction (Step 546); and for each direction of the plurality of directions, generating a visual content corresponding to the mathematical object in the mathematical space corresponding to the specific mathematical object and the direction, thereby generating the plurality of variations of the specific visual content (Step 548). In one example, the mathematical space may be a non-orientable space. Some non-limiting examples of such non-orientable space may include Mobius strips, Roman surfaces, real projective planes, and Klein bottles. In another example, the mathematical space may be an orientable space.

In some examples, Step 542 may comprise obtaining a plurality of directions in a mathematical space. For example, a direction may be selected at random. In another example, the plurality of direction may be preselected directions, such as equally spaced directions. In yet another example, a direction may be selected based on the specific visual content received by Step 502. For example, when the specific visual content is a first visual content, a first direction may be selected, and when the specific visual content is a second visual content, a second direction may be selected. The second direction may differ from the first direction.

In some examples, Step 544 may comprise obtaining a specific mathematical object in the mathematical space corresponding to the specific visual content received by Step 502. For example, a function of the specific visual content may be calculated to thereby determine the specific mathematical object corresponding with the specific visual content in the mathematical space. For example, the function may be a function of pixel values of the specific visual content, may be a function of voxels of the specific visual content, may be a function of low-level features of the specific visual content, may be a function of the one or more properties of the specific visual content, and so forth. Some non-limiting examples of such function may include a linear function, a non-linear function, an exponential function, a polynomial function, a logarithmic function, and so forth. In another example, each mathematical object in the mathematical space may corresponds to a visual content. In yet another example, the specific mathematical object may be determined based on a mapping, may be determined using a data-structure associating mathematical objects with visual contents, and so forth.

In some examples, Step 546 may comprise, for each direction of the plurality of directions obtained by Step 542, using the specific mathematical object obtained by Step 544 and the direction to determine a mathematical object in the mathematical space corresponding to the specific mathematical object and the direction. For example, a step of a selected length in the direction may be taken from the specific mathematical object to determine the mathematical object corresponding to the specific mathematical object and the direction.

In some examples, Step 548 may comprise, for each direction of the plurality of directions obtained by Step 542, generating a visual content corresponding to the mathematical object in the mathematical space corresponding to the specific mathematical object and the direction, thereby generating the plurality of variations of the specific visual content of Step 522. For example, each mathematical object in the mathematical space the mathematical space may corresponds to a visual content by the definition of the mathematical space. In another example, a function of the mathematical object may be calculated to determine a pixel value of a particular pixel of the visual content corresponding to the mathematical object or a voxel value of a particular voxel the visual content corresponding to the mathematical object.

FIG. 5D is a flowchart of an exemplary method 560 for identifying visual contents used for training of inference models. In this example, method 560 may comprise calculating a convolution of at least part of the specific visual content to thereby obtain a result value of the calculated convolution of the at least part of the specific visual content (Step 562); calculating a mathematical function of the result value of the calculated convolution of the at least part of the specific visual content (Step 564); selecting a threshold based on the data (Step 566); comparing the threshold with the mathematical function of the result value of the calculated convolution of the at least part of the specific visual content (Step 568); and determining the likelihood that the specific visual content is included in at least one training example of the plurality of training examples based on a result of the comparison of the threshold with the mathematical function of the result value of the calculated convolution of the at least part of the specific visual content (Step 570).

In some examples, Step 562 may comprise calculating a convolution of at least part of the specific visual content received by Step 502 to thereby obtain a result value of the calculated convolution of the at least part of the specific visual content. In some examples, Step 564 may comprise calculating a mathematical function of the result value (obtained by Step 562) of the calculated convolution of the at least part of the specific visual content. Some non-limiting examples of such function may include a linear function, a non-linear function, an exponential function, a polynomial function, a logarithmic function, and so forth. In some examples, Step 566 may comprise selecting a threshold based on the data accessed by Step 504. For example, the threshold may be a function of the data. Some non-limiting examples of such function may include a linear function, a non-linear function, an exponential function, a polynomial function, a logarithmic function, and so forth. In another example, when the data accessed by Step 504 have a first value, Step 566 may select a first threshold, and when the data accessed by Step 504 have a second value, Step 566 may select a second threshold. The second threshold may differ from the first threshold. In some examples, Step 568 may comprise comparing the threshold selected by Step 566 with the mathematical function (calculated by Step 564) of the result value of the calculated convolution of the at least part of the specific visual content obtained by Step 562. In some examples, Step 570 may comprise determining the likelihood of Step 506 that the specific visual content is included in at least one training example of the plurality of training examples based on a result of the comparison (of Step 568) of the threshold with the mathematical function of the result value of the calculated convolution of the at least part of the specific visual content. For example, when the result of the comparison is a first result, Step 570 may determine the likelihood is a first likelihood, and when the result of the comparison is a second result, Step 570 may determine the likelihood is a second likelihood. The second likelihood may differ from the first likelihood.

Extended reality environments may include non-realistic portions. The non-realistic portions may lessen the immersive experience of the extended reality environment. Therefore, it may be useful to replace the non-realistic portions with realistic versions of the non-realistic portions. Manual identification of non-realistic portions, as well as manual generation of such realistic versions and manual replacement of the non-realistic portions with the realistic versions may be slow, expensive and time-consuming, and may be completely impossible to perform in real-time. Therefore, automatic identification of the non-realistic portions, automatic generation of the realistic versions and an automatic replacement of the non-realistic portions with the realistic versions is desired.

Figure 6D:
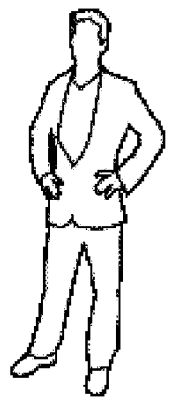
Figure 6E:
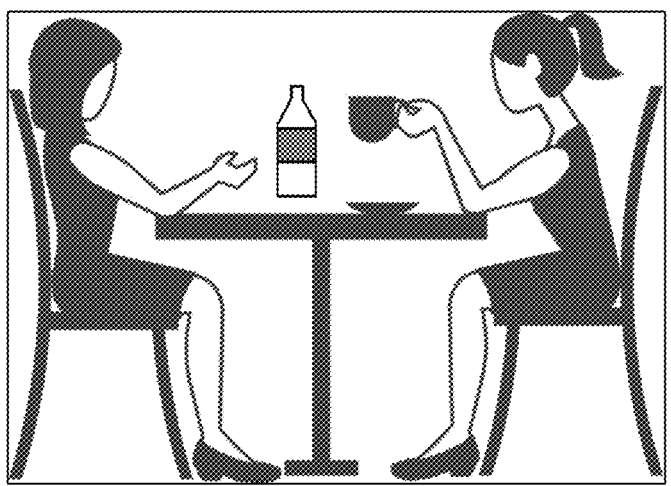
FIG. 6E is an illustration of exemplary extended reality environment.

FIGS. 6A, 6B, 6C and 6D are illustrations of exemplary visual contents. FIG. 6A is an illustration of a schematic drawing of a bottle. FIG. 6B is an illustration of a schematic drawing of a person. FIG. 6C is an illustration of a realistic image of a bottle. FIG. 6D is an illustration of a realistic image of a person. FIG. 6E is an illustration of exemplary extended reality environment. In this example, the extended reality environment two persons sitting around a table, talking and drinking coffee, while a schematic visual representation of a bottle is hovering slightly above the table.

FIG. 7 is a flowchart of an exemplary method 700 for transforming non-realistic virtual environments to realistic virtual environments. In this example, method 700 may comprise receiving first digital signals representing virtual content in an extended reality environment (Step 702); using the first digital signals to identify a non-realistic portion of the virtual content (Step 704); using a generative model to analyze the first digital signals to generate a realistic version of the identified non-realistic portion of the virtual content (Step 706); and generating second digital signals configured to cause a wearable extended reality appliance to present the generated realistic version instead of the identified non-realistic portion of the virtual content in the extended reality environment (Step 708). In one example, the entire extended reality environment may be non-realistic, method 700 may comprise Step 702, followed by Step 706, followed by Step 708, Step 706 may use the generative model to analyze the first digital signals to generate a realistic version of the entire extended reality environment, and the second digital signals may be configured to cause a wearable extended reality appliance to present the realistic version of the entire extended reality environment. In one example, the extended reality environment may include other non-realistic portions that are not identified by Step 704.

In one example, Step 702 may receive first digital signals representing virtual content in an extended reality environment that includes the schematic drawing of a bottle of FIG. 6A. Further, Step 704 may use the first digital signals to identify a non-realistic portion of the virtual content that includes the schematic drawing of a bottle of FIG. 6A. Further, Step 706 may use a generative model to analyze the first digital signals to generate the realistic version of the bottle of FIG. 6C. Further, Step 708 may generate second digital signals configured to cause a wearable extended reality appliance to present the generated realistic version of the bottle of FIG. 6C instead of the non-realistic bottle in the extended reality environment. In another example, Step 702 may receive first digital signals representing virtual content in an extended reality environment that includes the schematic drawing of a person of FIG. 6B. Further, Step 704 may use the first digital signals to identify a non-realistic portion of the virtual content that includes the schematic drawing of a person of FIG. 6B. Further, Step 706 may use a generative model to analyze the first digital signals to generate the realistic version of the person of FIG. 6D. Further, Step 708 may generate second digital signals configured to cause a wearable extended reality appliance to present the generated realistic version of the person of FIG. 6D instead of the non-realistic person in the extended reality environment. In yet another example, Step 702 may receive first digital signals representing virtual content in the extended reality environment of FIG. 6E that includes realistic visual representation of two persons sitting around a table, talking and drinking coffee, while a non-realistic visual representation of a bottle is hovering slightly above the table. Further, Step 704 may use the first digital signals to identify a non-realistic visual representation of the bottle. Further, Step 706 may use a generative model to analyze the first digital signals to generate the realistic version of the bottle, for example generating the realistic version of the bottle of FIG. 6C. Further, Step 708 may generate second digital signals configured to cause a wearable extended reality appliance to present the generated realistic version of the bottle of FIG. 6C instead of the non-realistic bottle in the extended reality environment, and to reposition the bottle to be placed on the table instead of hovering over the table, as illustrated in FIG. 3B.

In some examples, Step 702 may comprise receiving first digital signals representing virtual content in an extended reality environment. For example, receiving the first digital signals may comprise reading the first digital signals from memory, may comprise receiving the first digital signals from an external device (for example using a digital communication device), may comprise generating the first digital signals (for example, by analyzing geometrical data and/or color data associated with the virtual content, for example using a ray casting algorithm), and so forth. In one example, the first digital signals may include or may enable a rendering of the virtual content. In one example, the first digital signals may include geometrical data associated with the virtual content. In one example, the first digital signals may include three-dimensional data associated with the virtual content. In one example, the first digital signals may include color data associated with the virtual content. In one example, the first digital signals may include representation of a motion of the virtual content. In one example, the first digital signals may be or include digital display signals configured to cause the wearable extended reality appliance of Step 708 to present the virtual content in the extended reality environment. In one example, the first digital signals may encode geometric data associated with the virtual content, such as shapes, polygons, planes, manifolds, volumes, and so forth.

In some examples, Step 704 may comprise using the first digital signals received by Step 702 to identify a non-realistic portion of the virtual content. In one example, the non-realistic portion of the virtual content may be a continuous portion of the virtual content, may include a plurality of fragmented fragments of the virtual content, may be or include a virtual object, may be or include a portion of a virtual object, may be or include a portion of a virtual background, may be the entire virtual content, may include part but not all of the virtual content, may be the entire extended reality environment, and so forth. In one example, the identified non-realistic portion of the virtual content may be or include a virtual room (or a portion of a virtual room) in the extended reality environment. In one example, the identified non-realistic portion of the virtual content may move in the extended reality environment. In one example, the first digital signals may include an indication that a particular portion of the virtual content is non-realistic. In another example, Step 704 may analyze the first digital signals to identify the non-realistic portion of the virtual content. For example, a machine learning model may be trained using training examples to identify non-realistic portions of virtual contents. An example of such training example may include a sample virtual content, together with a label indicating a non-realistic portion of the sample virtual content. Step 704 may use the trained machine learning model to analyze the first digital signals to identify the non-realistic portion of the virtual content. In another example, Step 704 may calculate a convolution of at least part of the virtual content to thereby obtain a result value of the calculated convolution of the at least part of the virtual content, and may use the result value of the calculated convolution of the at least part of the virtual content to identify the non-realistic portion of the virtual content. For example, when the result value is a first value, the non-realistic portion identified by Step 704 may be a first portion of the virtual content, and when the result value is a second value, the non-realistic portion identified by Step 704 may be a second portion of the virtual content. The second portion may differ from the first portion. In some examples, the first digital signals received by Step 702 may be indicative of a field-of-view associated with the wearable extended reality appliance of Step 708, and Step 704 may select the non-realistic portion of the virtual content based on the field-of-view associated with the wearable extended reality appliance. For example, the non-realistic portion may be selected from within the field-of-view associated with the wearable extended reality appliance, while non-realistic parts of the virtual content that are outside the field-of-view may be excluded from the selected non-realistic portion. In another example, the non-realistic portion may be selected from parts of the virtual content that is either within the field-of-view or within a selected distance from the field-of-view, while non-realistic parts of the virtual content that are farther from the field-of-view may be excluded from the selected non-realistic portion. In some examples, Step 704 may use the first digital signals to cause the wearable extended reality appliance of Step 708 to present the virtual content to an individual, and may receive an input from the individual identifying the non-realistic portion of the virtual content. For example, the input may be received via a user interface, via gestures, via voice commands, via an input device associated with the wearable extended reality appliance, and so forth.

In some examples, Step 706 may comprise using a generative model to analyze the first digital signals received by Step 702 to generate a realistic version of the non-realistic portion of the virtual content identified by Step 704. For example, the generative model may be a generative model trained using training examples to generate realistic versions of non-realistic portions of virtual contents. An example of such training example may include a sample virtual content including a sample non-realistic portion, together with a realistic version of the sample non-realistic portion. Step 706 may use the trained generative model to analyze the first digital signals received by Step 702 to generate a realistic version of the non-realistic portion of the virtual content identified by Step 704. In some examples, Step 706 may analyze the first digital signals to determine a mathematical object in a mathematical space corresponding to the identified non-realistic portion of the virtual content. In one example, the mathematical space may be a non-orientable space. Some non-limiting examples of such non-orientable space may include Mobius strips, Roman surfaces, real projective planes, and Klein bottles. In another example, the mathematical space may be an orientable space. In one example, a function of the non-realistic portion of the virtual content may be calculated to thereby determine the mathematical object corresponding to the identified non-realistic portion of the virtual content. For example, the function may be a function of pixel values of the non-realistic portion of the virtual content, may be a function of voxels of the non-realistic portion of the virtual content, may be a function of low-level features of the non-realistic portion of the virtual content, may be a function of a geometrical shape of the non-realistic portion of the virtual content, may be a function of the one or more properties of the non-realistic portion of the virtual content, nay be a function of a portion of the first digital signals corresponding to the non-realistic portion of the virtual content, and so forth. Some non-limiting examples of such function may include a linear function, a non-linear function, an exponential function, a polynomial function, a logarithmic function, and so forth. In another example, each mathematical object in the mathematical space may corresponds to a visual content, and the determined mathematical object may be the mathematical object corresponding to the non-realistic portion. The mathematical object may be determined based on a mapping, may be determined using a data-structure associating mathematical objects with visual contents, and so forth. In some examples, Step 706 may use the mathematical object in the mathematical space corresponding to the identified non-realistic portion of the virtual content to generate the realistic version of the identified non-realistic portion of the virtual content. For example, the realistic version may be a function of the mathematical object. Some non-limiting examples of such function may include a linear function, a non-linear function, an exponential function, a polynomial function, a logarithmic function, and so forth. In another example, a function of the mathematical object corresponding to the identified non-realistic portion may be calculated to obtain a second mathematical object (for example, in the same mathematical space or in another mathematical space), and Step 706 may use the second mathematical object in the to generate the realistic version of the identified non-realistic portion of the virtual content. For example, the realistic version may be a function of the second mathematical object. In some examples, Step 706 may analyze the first digital signals to determine a category of the non-realistic portion of the virtual content, for example by classifying using a classification model the non-realistic portion to one class of a plurality of alternative classes, where each class is associated with a category. Further, Step may use the category of the non-realistic portion of the virtual content to select the generative model of a plurality of generative models. For example, Step 706 may use the category to access a data-structure associating categories with generative models to select the generative model.

In some examples, Step 708 may comprise generating second digital signals configured to cause a wearable extended reality appliance to present the realistic version generated by Step 706 instead of the non-realistic portion of the virtual content identified by Step 704 in the extended reality environment of Step 702. In one example, the second digital signals may include or may enable a rendering of the realistic version generated by Step 706. In one example, the second digital signals may include geometrical data associated with the realistic version generated by Step 706. In one example, the second digital signals may include three-dimensional data associated with the realistic version generated by Step 706. In one example, the second digital signals may include color data associated with the realistic version generated by Step 706. In one example, the second digital signals may include representation of a motion of the realistic version generated by Step 706. In one example, the second digital signals may include an indication of the non-realistic portion of the virtual content identified by Step 704, for example to enable presentation of the realistic version generated by Step 706 instead of the non-realistic portion of the virtual content identified by Step 704 in the extended reality environment of Step 702. In one example, the second digital signals may include an indication of one or more locations in the extended reality environment of Step 702 for the presentation of the realistic version generated by Step 706. In one example, Step 708 may use the second digital signals to store information encoded in the second digital signals in memory. In one example, Step 708 may transmit the second digital signals to an external device (for example, to wearable extended reality appliance, to a computerized device orchestrating the extended reality environment, and so forth). In some examples, the virtual content of Step 702 may include a second non-realistic portion different from the non-realistic portion of the virtual content identified by Step 704. Further, the second digital signals generated by Step 708 may be configured to cause the wearable extended reality appliance to present the realistic version generated by Step 706 instead of the non-realistic portion of the virtual content identified by Step 704 while presenting the second non-realistic portion. In some examples, Step 708 may switch between causing the wearable extended reality appliance to present the virtual content including the identified non-realistic portion of the virtual content and causing the wearable extended reality appliance to present the generated realistic version instead of the identified non-realistic portion of the virtual content in the extended reality environment based on inputs from an individual using the wearable extended reality appliance. For example, the input may be received via a user interface, via gestures, via voice commands, via an input device associated with the wearable extended reality appliance, and so forth.

In some examples, the non-realistic portion of the virtual content identified by Step 704 may include an avatar associated with an individual, the realistic version (generated by Step 706) of the identified non-realistic portion of the virtual content is a realistic depiction of the individual, and the analysis using the generative model (by Step 706) is based on a photo of the individual. For example, the generative model may be a generative model trained using training examples to generate realistic versions of non-realistic avatars based on images of individuals. An example of such training example may include a sample virtual content including a sample non-realistic avatar and a sample image of a sample individual, together with a realistic version of the sample non-realistic avatar, where the realistic version visually appears as the sample individual. Step 706 may use the trained generative model to analyze the first digital signals received by Step 702 to generate a realistic version of the non-realistic avatar based on the photo of the individual. In some examples, the non-realistic portion of the virtual content identified by Step 704 may include a non-realistic skin color, and Step 706 may replace the non-realistic skin color with a realistic skin color, thereby generating the realistic version of the identified non-realistic portion of the virtual content that replaces the non-realistic skin color with a realistic skin color. In some examples, the non-realistic portion of the virtual content identified by Step 704 may include a first element, a second element, and a non-realistic ratio between a size of a first element and a size of a second element. Further, generating the realistic version by Step 706 may include resizing of at least one of the first element or the second element. In one example, the realistic version of the identified non-realistic portion of the virtual content may include a realistic ratio between the size of the first element and the size of the second element as a result of the resizing. In some examples, the non-realistic portion of the virtual content identified by Step 704 may include a non-realistic scenery. Further, generating the realistic version by Step 706 may include replacing the non-realistic scenery with a realistic scenery thereby generating the realistic version of the identified non-realistic portion of the virtual content that replaces the non-realistic scenery with a realistic scenery.

More and more visual contents are generated artificially, for example using generative models. However, while some generated visual contents are realistic, others are non-realistic even when the original intention is to generate realistic versions, for example due to limitations of the generative models. It is useful to identify which of the artificially generated visual contents are realistic and which are non-realistic, for example to avoid usage of the non-realistic visual content or to evaluate and improve the generative models. Computerized models may fail to distinguish some of the non-realistic visual contents from the realistic visual contents. It is therefore useful to involve humans in the process. Automatically managing the manual process may increase efficiency and reduce errors.

Figure 8:
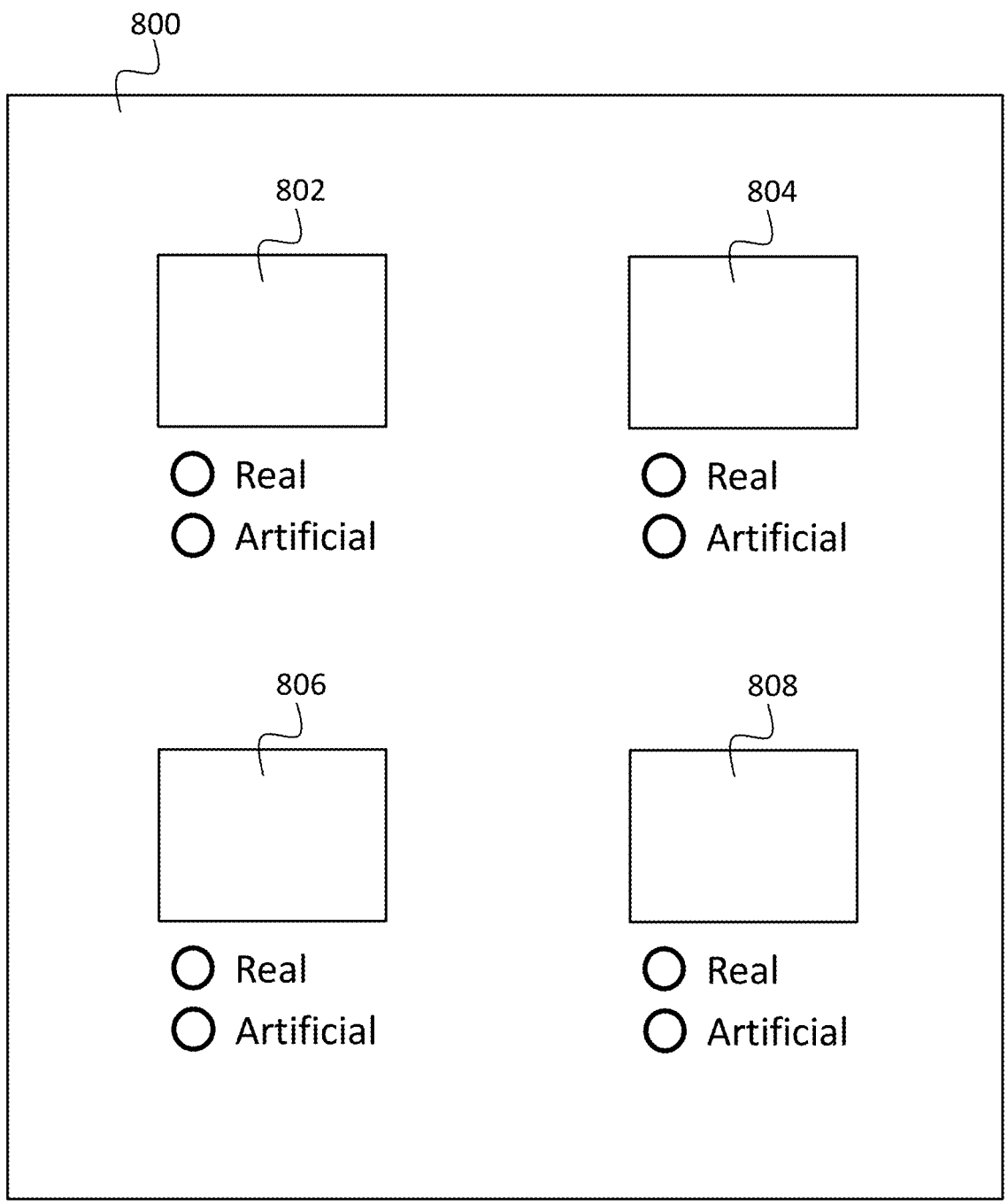
FIG. 8 is an illustration of exemplary user interface.

FIG. 8 is an illustration of exemplary user interface 800. In this example, user interface 800 includes a presentation of four visual contents, 802, 804, 806 and 808, together with a control next to each visual content enabling a user to mark the visual content as real or artificial. Additionally or alternatively, a control may enable the user to indicate a certainty of the marking of the visual content as real or artificial.

FIG. 9A is a flowchart of exemplary method 900 for determining a degree of realism of an artificially generated visual content. In this example, method 900 may comprise accessing one or more artificially generated visual contents, the one or more artificially generated visual contents include a particular artificially generated visual content (Step 902); accessing one or more captured visual contents, each visual content of the one or more captured visual contents was captured using an image sensor from a real physical environment (Step 904); for each person of a plurality of persons, presenting to the person a mix of visual contents (Step 906), the mix of visual contents may include at least one visual content of the one or more artificially generated visual contents and at least one visual content of the one or more captured visual contents, the mix of visual contents may include the particular artificially generated visual content; for each person of the plurality of persons, receiving from the person a reaction to the presentation to the person (Step 908), wherein for each visual content of a group of at least one of the mix of visual contents, the reaction may be indicative of whether the person believes that the visual content is an artificially generated visual content; and determining a degree of realism of the particular artificially generated visual content based on the reactions (Step 910).

In some examples, Step 902 may comprise accessing one or more artificially generated visual contents. The one or more artificially generated visual contents include a particular artificially generated visual content. Accessing the one or more artificially generated visual contents, for example by Step 902, may comprise accessing the one or more artificially generated visual contents in a digital memory, may comprise communicating with an external device that holds the one or more artificially generated visual contents (for example, using a digital communication device), may comprise generating the one or more artificially generated visual contents (for example, using a generative model), and so forth. In one example, each artificially generated visual content of the one or more artificially generated visual contents may be generated using a conditional generative adversarial network, for example, each artificially generated visual content of the one or more artificially generated visual contents may be generated using a conditional generative adversarial network with a different input condition. In some examples, for each visual content of the one or more artificially generated visual contents, Step 902 may analyze the visual content using a machine learning model to determine a level of certainty that the visual content is realistic. For example, the one or more artificially generated visual contents may only include visual contents that an automated analysis (for example using the same of a different machine learning model) determined to be realistic. In one example, the machine learning model may be a machine learning model trained using training examples to determine levels of certainties that visual contents are realistic. An example of such training example may include a sample visual content, together with a label indicating a level of certainty that the sample visual content is realistic. Step 902 may use the trained machine learning model to analyze the visual content and determine the level of certainty that the visual content is realistic. Further, Step 902 may select the particular artificially generated visual content from the one or more artificially generated visual contents based on the levels of certainties. For example, Step 902 may select the visual content associated with the lowest certainty from the one or more artificially generated visual contents to be the particular artificially generated visual content. In another example, Step 902 may select the visual content associated with the lowest certainty from visuals contents of the one or more artificially generated visual contents that were determined to be realistic by an automated analysis (for example using the same of a different machine learning model) to be the particular artificially generated visual content.

In some examples, Step 904 may comprise accessing one or more captured visual contents, each visual content of the one or more captured visual contents was captured using an image sensor from a real physical environment. Accessing the one or more captured visual contents, for example by Step 904, may comprise accessing the one or more captured visual contents in a digital memory, may comprise communicating with an external device that holds the one or more captured visual contents (for example, using a digital communication device), may comprise capturing the one or more captured visual contents using at least one image sensor, and so forth.

In some examples, Step 906 may comprise, for each person of a plurality of persons, presenting to the person a mix of visual contents. The mix of visual contents may include at least one visual content of the one or more artificially generated visual contents accessed by Step 902 and at least one visual content of the one or more captured visual contents accessed by Step 904. The mix of visual contents may include the particular artificially generated visual content accessed by Step 902. For example, the mix of visual contents may be presented to the person via a user interface (for example, via user interface 800 or via a different user interface). In one example, the mix of visual contents presented by Step 906 to one person of the plurality of persons is identical to the mix of visual contents presented by Step 906 to another person of the plurality of persons. In another example, the mix of visual contents presented by Step 906 to one person of the plurality of persons may differ from the mix of visual contents presented by Step 906 to another person of the plurality of persons.

In some examples, Step 908 may comprise, for each person of the plurality of persons of Step 906, receiving from the person a reaction to the presentation of Step 906. For each visual content of a group of at least one of the mix of visual contents of Step 906, the reaction may be indicative of whether the person believes that the visual content is an artificially generated visual content. The group of at least one of the mix of visual contents of Step 906 may include exactly one visual content, may include one or more visual contents, may include exactly two visual contents, may include two or more visual contents, may include three or more visual contents, may include ten of more visual contents, may include the particular artificially generated visual content accessed by Step 902, and so forth. It is understood that indication of whether the person believes that the visual content is realistic is indicative of whether the person believes that the visual content is an artificially generated visual content. In one example, the reaction may be received via a user interface (for example, via a user interface used by Step 906 to present the mix to the person, via user interface 800, via a different user interface, and so forth). In another example, the reaction may be received via a voice command, via a gesture, via a text input, via a pointing device, via a keyboard, via an image sensor, via an audio sensor, and so forth. In one example, the reaction may be further indicative of a certainty of the person in the belief that the visual content is an artificially generated visual content.

In some examples, Step 910 may comprise determining a degree of realism of the particular artificially generated visual content accessed by Step 902 based on the reactions received by Step 908. For example, Step 910 may calculate a function of the reactions to determine the degree of realism of the particular artificially generated visual content. Some non-limiting examples of such function may include a linear function, a non-linear function, an exponential function, a polynomial function, a logarithmic function, and so forth. In one example, the function may be invariant to the persons, such as an average of the reactions. In another example, the function may treat differently reactions of different people. For example, each person may be associated with a weight, and the function may be a weighted average of the reactions. In one example, a machine learning model may be trained using training examples to determine degrees of realism from reactions. An example of such training example may include sample reactions associated with a sample visual content, together with a label indicating a degree of realism of the sample visual content. Step 910 may use the trained machine learning model to analyze the reactions received by Step 908 and determine the degree of realism of the particular artificially generated visual content accessed by Step 902. In one example, the degree of realism of the particular artificially generated visual content determined by Step 910 may be an absolute degree. Some non-limiting examples of such absolute degree may include 'Very Realistic', 'Realistic', 'Not realistic', 'Absurd', a score of a predefined range of scores (such as 8.2 in a range of 0 to 10), a percent (such as 71% of the people believed this to be realistic), and so forth. In another example, the degree of realism of the particular artificially generated visual content determined by Step 910 may be a relative degree with respect to at least one other artificially generated visual content. Some non-limiting examples of such relative degree may include 'More realistic', 'Less realistic', 'Equally realistic', 'Most realistic of the group of visual contents', 'Least realistic of the group of visual contents', '30% more realistic', '20% less realistic', and so forth. In one example, the degree of realism of the particular artificially generated visual content determined by Step 910 may be based on a comparison of the reactions to the particular artificially generated visual content and at least one reaction to another artificially generated visual content of the one or more artificially generated visual contents accessed by Step 902. For example, the comparison may show that more people found the particular artificially generated visual content realistic than the other artificially generated visual content, and in response the degree of realism may be 'More realistic' or may be increased. In another example, the degree of realism of the particular artificially generated visual content determined by Step 910 may be based on a comparison of the reactions to the particular artificially generated visual content and at least one reaction to a visual content of the one or more captured visual contents accessed by Step 904. For example, the comparison may show that less people found the particular artificially generated visual content realistic than the visual content of the one or more captured visual contents, and in response the degree of realism may be 'Less realistic' or may be decreased.

In some examples, method 900 may further comprise determining whether to delete the particular artificially generated visual content accessed by Step 902 based on the degree of realism of the particular artificially generated visual content determined by Step 910. For example, when the determined degree of realism is below a selected value, method 900 may delete the particular artificially generated visual content, and when the determined degree of realism is above the selected value, method 900 may avoid deleting the particular artificially generated visual content. In one example, the selected value may be preselected (for example, by a user, by a configuration, and so forth). In another example, the selected value may be based on the particular artificially generated visual content. In yet another example, the selected value may be based on determined degree of realism of at least one other visual content. In one example, deleting the particular artificially generated visual content determined by Step 910 may include at least one of deleting the particular artificially generated visual content from memory, removing the particular artificially generated visual content from a data-structure (or from a database), causing an external device to delete the particular artificially generated visual content (for example, by transmitting a digital signal to the external device), or marking in memory the particular artificially generated visual content as deleted.

In some examples, method 900 may further comprise determining whether to use the particular artificially generated visual content accessed by Step 902 for a particular usage based on the determined degree of realism of the particular artificially generated visual content determined by Step 910. For example, when the determined degree of realism is above a selected value, method 900 may use the particular artificially generated visual content for the particular usage, and when the determined degree of realism is below the selected value, method 900 may avoid using the particular artificially generated visual content for the particular usage. In one example, the selected value may be preselected (for example, by a user, by a configuration, and so forth). In another example, the selected value may be based on the particular artificially generated visual content. In yet another example, the selected value may be based on determined degree of realism of at least one other visual content. Some non-limiting examples of such particular usage may include storing the visual content in memory, presenting the visual content to an individual (for example, via a user interface, via a physical display screen, etc.), analyzing the visual content to determine information, and so forth.

In some examples, method 900 may further comprise analyzing the particular artificially generated visual content accessed by Step 902 to determine at least one reason for the degree of realism of the particular artificially generated visual content determined by Step 910. In one example, the analysis may be based on the reactions received by Step 908. In one example, the analysis may be based on the degree of realism of the particular artificially generated visual content determined by Step 910. In one example, a machine learning model may be trained using training examples to determine reasons for degrees of realism of visual contents. An example of such training example may include a sample visual content associated with a sample degree of realism, together with a label indicating one or more reasons for the sample degree of realism. The trained machine learning model may be used to analyze the particular artificially generated visual content accessed by Step 902 and determine the at least one reason for the degree of realism of the particular artificially generated visual content determined by Step 910. In one example, a convolution of at least part of the particular artificially generated visual content accessed by Step 902 may be calculated to thereby obtain a result value of the calculated convolution of the at least part of the particular artificially generated visual content. Further, the result value of the calculated convolution of the at least part of the particular artificially generated visual content may be used to determine the at least one reason for the determined degree of realism of the particular artificially generated visual content. For example, when the result value is a first value, a first reason for the determined degree of realism may be determined, and when the result value is a second value, a second reason for the determined degree of realism may be determined. The second reason may differ from the first reason. In one example, method 900 may further comprise presenting the determined at least one reason to an individual, for example via a user interface, visually, audibly, graphically, textually, and so forth. In one example, method 900 may further comprise using the at least one reason to generate a new artificially generated visual content. For example, the new artificially generated visual content may be generated to overcome the at least one reason. In one example, when the reason is 'top left corner is too dark', the particular artificially generated visual content accessed by Step 902 may be transformed to make the top left corner more bright. In another example, when the reason is 'face skin tone does not match body skin tone', the skin tone of the face in the particular artificially generated visual content accessed by Step 902 may be modified to match the body skin tone. In yet another example, when the reason is 'the proportion between the size of the arm and the size of the body is wrong', at least one of the arm and the body may be resized in the particular artificially generated visual content accessed by Step 902 to correct the proportion.

FIG. 9B is a flowchart of exemplary method 920 for determining a degree of realism of an artificially generated visual content. In some examples, the one or more artificially generated visual contents accessed by Step 902 may include a specific artificially generated visual content, the specific artificially generated visual content may differ from the particular artificially generated visual content accessed by Step 902. Method 920 may comprise determining a degree of realism of the specific artificially generated visual content based on at least one reaction to the specific artificially generated visual content (Step 922); comparing data associated with the specific artificially generated visual content to data associated with the particular artificially generated visual content (Step 924); and, based on a result of the comparison, determining at least one reason for the determined degree of realism of the particular artificially generated visual content (Step 926).

In some examples, Step 922 may comprise determining a degree of realism of a specific artificially generated visual content included in the one or more artificially generated visual contents accessed by Step 902 based on at least one reaction to the specific artificially generated visual content, for example as described above in relation to method 900 and the particular artificially generated visual content accessed by Step 902. The specific artificially generated visual content may differ from the particular artificially generated visual content accessed by Step 902. In one example, the specific artificially generated visual content may be included in all mixes presented by Step 906, and the at least one reaction to the specific artificially generated visual content may be the reactions received by Step 908. In another example, the specific artificially generated visual content may be included in a particular mix presented to a particular person by Step 906, and the at least one reaction to the specific artificially generated visual content may include the reaction received from the particular person by Step 908. In yet another example, the at least one reaction to the specific artificially generated visual content may include one or more reactions not included in the reactions received by Step 908. In an additional example, the reactions received by Step 908 may include one or more reactions not included in the at least one reaction to the specific artificially generated visual content.

In some examples, Step 924 may comprise comparing data associated with the specific artificially generated visual content of Step 922 to data associated with the particular artificially generated visual content accessed by Step 902. For example, Step 924 may compare pixel data associated with the specific artificially generated visual content of Step 922 to pixel data associated with the particular artificially generated visual content accessed by Step 902. In another example, Step 924 may analyze using a visual object detection algorithm each visual content of the specific and the particular artificially generated visual contents to identify objects depicted in the visual content, and may compare the objects depicted in the specific artificially generated visual content of Step 922 to the objects depicted in the particular artificially generated visual content accessed by Step 902. For example, comparing objects may include comparing at least one of types, quantities, sizes, appearances (such as brightness or color), locations or spatial orientations of the objects. In yet another example, Step 924 may analyze using a visual event detection algorithm each visual content of the specific and the particular artificially generated visual contents to identify events depicted in the visual content, and may compare the events depicted in the specific artificially generated visual content of Step 922 to the events depicted in the particular artificially generated visual content accessed by Step 902. For example, comparing events may include comparing at least one of types, durations, timing, locations or objects associated with the events.

In some examples, each one of the one or more artificially generated visual contents accessed by Step 902 may be a result of applying a function to a different input value. One non-limiting example of such function may include a conditional generative adversarial network and the input value may be an input condition. Further, the data associated with the particular artificially generated visual content of Step 902 may be or include the input value associated with the particular artificially generated visual content, and the data associated with the specific artificially generated visual content of Step 922 may be or include the input value associated with the specific artificially generated visual content. In this example, Step 924 may compare the input value associated with the specific artificially generated visual content of Step 922 to the input value associated with the particular artificially generated visual content accessed by Step 902. In some examples, Step 924 may analyze the particular artificially generated visual content accessed by Step 902 to determine the data associated with the particular artificially generated visual content, and/or may analyze the specific artificially generated visual content of Step 922 to determine the data associated with the specific artificially generated visual content. For example, a machine learning model may be trained using training examples to determine data based on visual contents. An example of such training example may include a sample visual content, together with a label indicating data associated with the visual content. Step 924 may use the trained machine learning model to analyze the particular artificially generated visual content to determine the data associated with the particular artificially generated visual content, and/or to analyze the specific artificially generated visual content to determine the data associated with the specific artificially generated visual content. In some examples, Step 924 may calculate a convolution of at least part of the particular artificially generated visual content accessed by Step 902 to thereby determine the data associated with the particular artificially generated visual content, and/or may calculate a convolution of at least part of the specific artificially generated visual content of Step 922 to thereby determine the data associated with the specific artificially generated visual content. For example, the data associated with a visual content may include or be a result value of a convolution of at least part of the visual content, may be or include a function of the result value of a convolution of at least part of the visual content, and so forth.

In some examples, Step 926 may comprise, based on a result of the comparison of Step 924, determining at least one reason for the determined degree of realism of the particular artificially generated visual content. In some examples, Step 926 may base the determination of the at least one reason for the determined degree of realism of the particular artificially generated visual content on a result of the comparison of Step 924, the degree of realism of the particular artificially generated visual content determined by Step 910 and the degree of realism of the specific artificially generated visual content determined by Step 922. In some examples, the comparison of Step 924 may identify a visual difference between the specific artificially generated visual content of Step 922 to the particular artificially generated visual content accessed by Step 902, and the difference in the degrees of realism between the two may be attributed to the visual difference. For example, the visual difference may be a difference in a skin tone of a person depicted in both the specific and the particular artificially generated visual content, and the reason may be 'unrealistic skin tone'. In another example, the visual difference may be a difference in a size of a limb of a person depicted in both the specific and the particular artificially generated visual content, and the reason may be 'unrealistic limb size'.

In one example, method 920 may further comprise presenting the determined at least one reason to an individual, for example via a user interface, visually, audibly, graphically, textually, and so forth. In one example, method 920 may further comprise using the at least one reason to generate a new artificially generated visual content, for example as described above in relation to method 900.

FIG. 9C is a flowchart of exemplary method 940 for determining a degree of realism of an artificially generated visual content. In some examples, the one or more artificially generated visual contents accessed by Step 902 may include a specific artificially generated visual content, the specific artificially generated visual content may differ from the particular artificially generated visual content accessed by Step 902. Method 940 may comprise determining a degree of realism of the specific artificially generated visual content based on at least one reaction to the specific artificially generated visual content (Step 922); determining a particular mathematical object, in a mathematical space, associated with the particular artificially generated visual content (Step 944); determining a specific mathematical object, in the mathematical space, associated with the specific artificially generated visual content (Step 946); using the determined degree of realism of the particular artificially generated visual content, the determined degree of realism of the specific artificially generated visual content, the particular mathematical object and the specific mathematical object to determine a new mathematical object in the mathematical space (Step 948), the new mathematical object may differ from the particular mathematical object and the specific mathematical object; and using the new mathematical object in the mathematical space to generate a new artificially generated visual content (Step 950).

In some examples, a mathematical object, in a mathematical space, associated with an artificially generated visual content may be determined. For example, Step 944 may comprise determining a particular mathematical object, in a mathematical space, associated with the particular artificially generated visual content accessed by Step 902. In another example, Step 946 may comprise determining a specific mathematical object, in the mathematical space, associated with the specific artificially generated visual content of Step 922. In one example, the mathematical space may be a non-orientable space. Some non-limiting examples of such non-orientable space may include Mobius strips, Roman surfaces, real projective planes, and Klein bottles. In another example, the mathematical space may be an orientable space. In some examples, the artificially generated visual content may be analyzed to determine the mathematical object, in the mathematical space, associated with the artificially generated visual content. For example, a function of the artificially generated visual content may be calculated to thereby determine the mathematical object associated with the artificially generated visual content. For example, the function may be a function of pixel values of the artificially generated visual content, may be a function of voxels of the artificially generated visual content, may be a function of low-level features of the artificially generated visual content, may be a function of one or more properties of the artificially generated visual content, and so forth. Some non-limiting examples of such function may include a linear function, a non-linear function, an exponential function, a polynomial function, a logarithmic function, and so forth. In another example, the mathematical object may be determined based on a mapping, may be determined using a data-structure associating mathematical objects with visual contents, and so forth.

In some examples, Step 948 may comprise using the degree of realism of the particular artificially generated visual content determined by Step 910, the degree of realism of the specific artificially generated visual content determined by Step 922, the particular mathematical object determined by Step 944 and the specific mathematical object determined by Step 946 to determine a new mathematical object in the mathematical space. The new mathematical object may differ from the particular mathematical object and the specific mathematical object. For example, the new mathematical object may be a weighted average of the particular mathematical object determined by Step 944 and the specific mathematical object determined by Step 946, where the weights are selected based on the degree of realism of the particular artificially generated visual content determined by Step 910 and the degree of realism of the specific artificially generated visual content determined by Step 922. In another example, the new mathematical object may be a function of the degree of realism of the particular artificially generated visual content determined by Step 910, the degree of realism of the specific artificially generated visual content determined by Step 922, the particular mathematical object determined by Step 944 and the specific mathematical object determined by Step 946. Some non-limiting examples of such function may include a linear function, a non-linear function, an exponential function, a polynomial function, a logarithmic function, and so forth.

In some examples, Step 950 may comprise using the new mathematical object in the mathematical space determined by Step 948 to generate a new artificially generated visual content. For example, the new artificially generated visual content (or at least one pixel value of the artificially generated visual content) may be a function of the new mathematical object. Some non-limiting examples of such function may include a linear function, a non-linear function, an exponential function, a polynomial function, a logarithmic function, and so forth. In another example, each mathematical object in the mathematical space may correspond to a visual content, and the new artificially generated visual content may be the visual content corresponding to the new mathematical object. In another example, Step 950 may use the new mathematical object to access a data-structure associating mathematical objects with visual contents to determine the new artificially generated visual content.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. A non-transitory computer readable medium containing instructions for causing at least one processor to perform operations for identifying visual contents used for training of inference models, the operations comprising:
   receiving a specific visual content;
   accessing data based on at least one parameter of an inference model, the inference model is a result of training a machine learning algorithm using a plurality of training examples, each training example of the plurality of training examples includes a visual content;
   analyzing the data and the specific visual content to determine a likelihood that the specific visual content is included in at least one training example of the plurality of training examples;
   generating a digital signal indicative of the likelihood that the specific visual content is included in at least one training example of the plurality of training examples;
   calculating a convolution of at least part of the specific visual content to thereby obtain a result value of the calculated convolution of the at least part of the specific visual content;
   calculating a mathematical function of the result value of the calculated convolution of the at least part of the specific visual content;
   selecting a threshold based on the data;
   comparing the threshold with the mathematical function of the result value of the calculated convolution of the at least part of the specific visual content; and
   determining the likelihood that the specific visual content is included in at least one training example of the plurality of training examples based on a result of the comparison of the threshold with the mathematical function of the result value of the calculated convolution of the at least part of the specific visual content.

2. The non-transitory computer readable medium of claim 1, wherein the likelihood is a binary likelihood, and determining the likelihood that the specific visual content is included in at least one training example of the plurality of training examples includes determining whether the specific visual content is included in at least one training example of the plurality of training examples.

3. The non-transitory computer readable medium of claim 1, wherein the operations further comprise:
   using the specific visual content and the at least one parameter of the inference model to obtain an output of the inference model corresponding to the specific visual content; and
   basing the data on the output of the inference model corresponding to the specific visual content.

4. The non-transitory computer readable medium of claim 1, wherein the operations further comprise:
   using the specific visual content to generate a plurality of variations of the specific visual content;
   for each variation of the plurality of variations, using the variation and the at least one parameter of the inference model to obtain an output of the inference model corresponding to the variation; and
   basing the data on the outputs of the inference model corresponding to the plurality of variations.

5. The non-transitory computer readable medium of claim 4, wherein the operations further comprise:
   obtaining a plurality of directions in a mathematical space;
   obtaining a specific mathematical object in the mathematical space corresponding to the specific visual content;
   for each direction of the plurality of directions, using the specific mathematical object and the direction to determine a mathematical object in the mathematical space corresponding to the specific mathematical object and the direction; and
   for each direction of the plurality of directions, generating a visual content corresponding to the mathematical object in the mathematical space corresponding to the specific mathematical object and the direction, thereby generating the plurality of variations of the specific visual content.

6. The non-transitory computer readable medium of claim 5, wherein the mathematical space is a non-orientable space.

7. The non-transitory computer readable medium of claim 4, wherein the operations further comprise:
selecting a plurality of objects, no object of the plurality of objects is depicted in the specific visual content; and
for each object in the plurality of objects, analyzing the specific visual content to generate a variation of the specific visual content that includes a depiction of the object, thereby generating the plurality of variations of the specific visual content.

8. The non-transitory computer readable medium of claim 4, wherein the operations further comprise:
analyzing the specific visual content to detect a plurality of objects depicted in the specific visual content; and
for each object in the plurality of objects, analyzing the specific visual content to generate a variation of the specific visual content that do not include a depiction of the object, thereby generating the plurality of variations of the specific visual content.

9. The non-transitory computer readable medium of claim 1, wherein the operations further comprise:
using the specific visual content and the at least one parameter of the inference model to obtain a gradient corresponding to the specific visual content; and
basing the data on the gradient corresponding to the specific visual content.

10. The non-transitory computer readable medium of claim 1, wherein the operations further comprise:
using the specific visual content and the at least one parameter of the inference model to calculate a loss corresponding to the specific visual content and to a loss function associated with the machine learning algorithm; and
basing the data on the loss corresponding to the specific visual content and to the loss function.

11. The non-transitory computer readable medium of claim 1, wherein the operations further comprise:
analyzing the data and the specific visual content to determine a likelihood that an augmented version of the specific visual content is included in at least one training example of the plurality of training examples; and
generating a second digital signal indicative of the likelihood that an augmented version of the specific visual content is included in at least one training example of the plurality of training examples.

12. The non-transitory computer readable medium of claim 1, wherein the inference model is a generative model, and wherein for each training example of the plurality of training examples, the visual content included in the training example is a pair of visual contents, an input visual content and a desired output visual content.

13. The non-transitory computer readable medium of claim 1, wherein the operations further comprise:
analyzing the data and the specific visual content to determine a measure of similarity of the specific visual content to a selected training example of the plurality of training examples; and
generating a second digital signal indicative of the measure of similarity of the specific visual content to the selected training example of the plurality of training examples.

14. The non-transitory computer readable medium of claim 13, wherein the measure of similarity is indicative of an amount of augmentation.

15. The non-transitory computer readable medium of claim 13, wherein the second digital signal is indicative of the selected training example of the plurality of training examples.

16. The non-transitory computer readable medium of claim 13, wherein the selected training example of the plurality of training examples is the most similar training example in the plurality of training examples to the specific visual content.

17. The non-transitory computer readable medium of claim 1, wherein the operations further comprise:
accessing a data structure associating visual contents with sources to determine that the specific visual content is associated with a specific source; and
including an indication of the specific source in the generated digital signal.

18. A system for identifying visual contents used for training of inference models, the system comprising:
at least one processor configured to perform the operations of:
receiving a specific visual content;
accessing data based on at least one parameter of an inference model, the inference model is a result of training a machine learning algorithm using a plurality of training examples, each training example of the plurality of training examples includes a visual content;
analyzing the data and the specific visual content to determine a likelihood that the specific visual content is included in at least one training example of the plurality of training examples;
generating a digital signal indicative of the likelihood that the specific visual content is included in at least one training example of the plurality of training examples;
calculating a convolution of at least part of the specific visual content to thereby obtain a result value of the calculated convolution of the at least part of the specific visual content;
calculating a mathematical function of the result value of the calculated convolution of the at least part of the specific visual content;
selecting a threshold based on the data;
comparing the threshold with the mathematical function of the result value of the calculated convolution of the at least part of the specific visual content; and
determining the likelihood that the specific visual content is included in at least one training example of the plurality of training examples based on a result of the comparison of the threshold with the mathematical function of the result value of the calculated convolution of the at least part of the specific visual content.

19. A method for identifying visual contents used for training of inference models, the method comprising:
receiving a specific visual content;
accessing data based on at least one parameter of an inference model, the inference model is a result of training a machine learning algorithm using a plurality of training examples, each training example of the plurality of training examples includes a visual content;
analyzing the data and the specific visual content to determine a likelihood that the specific visual content is included in at least one training example of the plurality of training examples;

generating a digital signal indicative of the likelihood that the specific visual content is included in at least one training example of the plurality of training examples;
calculating a convolution of at least part of the specific visual content to thereby obtain a result value of the calculated convolution of the at least part of the specific visual content;
calculating a mathematical function of the result value of the calculated convolution of the at least part of the specific visual content;
selecting a threshold based on the data;
comparing the threshold with the mathematical function of the result value of the calculated convolution of the at least part of the specific visual content; and
determining the likelihood that the specific visual content is included in at least one training example of the plurality of training examples based on a result of the comparison of the threshold with the mathematical function of the result value of the calculated convolution of the at least part of the specific visual content.

20. A non-transitory computer readable medium containing instructions for causing at least one processor to perform operations for identifying visual contents used for training of inference models, the operations comprising:
receiving a specific visual content;
accessing data based on at least one parameter of an inference model, the inference model is a result of training a machine learning algorithm using a plurality of training examples, each training example of the plurality of training examples includes a visual content;
analyzing the data and the specific visual content to determine a likelihood that the specific visual content is included in at least one training example of the plurality of training examples;
generating a digital signal indicative of the likelihood that the specific visual content is included in at least one training example of the plurality of training examples, using the specific visual content to generate a plurality of variations of the specific visual content;
for each variation of the plurality of variations, using the variation and the at least one parameter of the inference model to obtain an output of the inference model corresponding to the variation;
basing the data on the outputs of the inference model corresponding to the plurality of variations;
obtaining a plurality of directions in a mathematical space;
obtaining a specific mathematical object in the mathematical space corresponding to the specific visual content;
for each direction of the plurality of directions, using the specific mathematical object and the direction to determine a mathematical object in the mathematical space corresponding to the specific mathematical object and the direction; and
for each direction of the plurality of directions, generating a visual content corresponding to the mathematical object in the mathematical space corresponding to the specific mathematical object and the direction, thereby generating the plurality of variations of the specific visual content.

21. A non-transitory computer readable medium containing instructions for causing at least one processor to perform operations for identifying visual contents used for training of inference models, the operations comprising:
receiving a specific visual content;
accessing data based on at least one parameter of an inference model, the inference model is a result of training a machine learning algorithm using a plurality of training examples, each training example of the plurality of training examples includes a visual content;
analyzing the data and the specific visual content to determine a likelihood that the specific visual content is included in at least one training example of the plurality of training examples;
generating a digital signal indicative of the likelihood that the specific visual content is included in at least one training example of the plurality of training examples, using the specific visual content to generate a plurality of variations of the specific visual content;
for each variation of the plurality of variations, using the variation and the at least one parameter of the inference model to obtain an output of the inference model corresponding to the variation;
basing the data on the outputs of the inference model corresponding to the plurality of variations;
selecting a plurality of objects, no object of the plurality of objects is depicted in the specific visual content; and
for each object in the plurality of objects, analyzing the specific visual content to generate a variation of the specific visual content that includes a depiction of the object, thereby generating the plurality of variations of the specific visual content.

22. A non-transitory computer readable medium containing instructions for causing at least one processor to perform operations for identifying visual contents used for training of inference models, the operations comprising:
receiving a specific visual content;
accessing data based on at least one parameter of an inference model, the inference model is a result of training a machine learning algorithm using a plurality of training examples, each training example of the plurality of training examples includes a visual content;
analyzing the data and the specific visual content to determine a likelihood that the specific visual content is included in at least one training example of the plurality of training examples;
generating a digital signal indicative of the likelihood that the specific visual content is included in at least one training example of the plurality of training examples;
using the specific visual content to generate a plurality of variations of the specific visual content;
for each variation of the plurality of variations, using the variation and the at least one parameter of the inference model to obtain an output of the inference model corresponding to the variation;
basing the data on the outputs of the inference model corresponding to the plurality of variations;
analyzing the specific visual content to detect a plurality of objects depicted in the specific visual content; and
for each object in the plurality of objects, analyzing the specific visual content to generate a variation of the specific visual content that do not include a depiction of the object, thereby generating the plurality of variations of the specific visual content.

* * * * *